US012385787B2

(12) United States Patent
Johnston et al.

(10) Patent No.: US 12,385,787 B2
(45) Date of Patent: Aug. 12, 2025

(54) TERAHERTZ ELECTROMAGNETIC RADIATION DETECTOR

(71) Applicant: Oxford University Innovation Limited, Oxford (GB)

(72) Inventors: Michael Benjamin Johnston, Oxford (GB); Kun Peng, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 132 days.

(21) Appl. No.: 17/800,284

(22) PCT Filed: Feb. 25, 2021

(86) PCT No.: PCT/GB2021/050480
§ 371 (c)(1),
(2) Date: Aug. 17, 2022

(87) PCT Pub. No.: WO2021/171020
PCT Pub. Date: Sep. 2, 2021

(65) Prior Publication Data
US 2023/0070738 A1 Mar. 9, 2023

(30) Foreign Application Priority Data
Feb. 25, 2020 (GB) ..................... 2002640

(51) Int. Cl.
*G01J 5/02* (2022.01)
*G01J 5/08* (2022.01)
(52) U.S. Cl.
CPC ............. *G01J 5/023* (2013.01); *G01J 5/0837* (2013.01)
(58) Field of Classification Search
CPC ............ G01J 5/023; G01J 5/0837; G01J 3/42; G01J 5/20; G01N 21/3586; B82Y 15/00
See application file for complete search history.

(56) References Cited

U.S. PATENT DOCUMENTS

| | | | |
|---|---|---|---|
| 2010/0276597 A1 | 11/2010 | Ouvrier-Buffet | |
| 2012/0113417 A1* | 5/2012 | Linfield | H01L 21/02581 |
| | | | 257/E33.044 |
| 2014/0375512 A1 | 12/2014 | Knap et al. | |

FOREIGN PATENT DOCUMENTS

| | | |
|---|---|---|
| EP | 3 546 904 A1 | 10/2019 |
| JP | 2013 228330 A | 11/2013 |

(Continued)

OTHER PUBLICATIONS

International Search Report and Written Opinion for WO 2021/171020 (PCT/GB2021/050480), dated Jun. 7, 2021, pp. 1-16.

(Continued)

*Primary Examiner* — David P Porta
*Assistant Examiner* — Gisselle M Gutierrez
(74) *Attorney, Agent, or Firm* — Thomas|Horstemeyer, LLP

(57) ABSTRACT

A detector for detecting terahertz electromagnetic radiation comprises a substrate and a pair of electrically isolated detector elements supported thereon. Each detector element comprises a pair of antenna elements having a gap therebetween and a switch element comprising one or more pieces of photoconductive semiconductor material connected between the antenna elements across the gap. The pairs of antenna elements of the respective detector elements are configured so that, when the switch element is conductive, current is generated between the antenna elements by polarisation components of incident terahertz electromagnetic radiation having polarisation directions in respective sensing directions that are perpendicular, thereby providing simultaneous detection of perpendicular polarisation components of incident terahertz electromagnetic radiation.

25 Claims, 19 Drawing Sheets

(56) References Cited

FOREIGN PATENT DOCUMENTS

| JP | 2015 049096 A | 3/2015 | |
|---|---|---|---|
| WO | WO-2006072762 A1 * | 7/2006 | ............... G01J 1/42 |
| WO | 2015/114599 A1 | 8/2015 | |

OTHER PUBLICATIONS

UK Search Report for GB 2002640.7, dated Aug. 20, 2020, pp. 1-4.

Peng Kun et al: "Broadband Phase-Sensitive Single InP Nanowire Photoconductive Terahertz Detectors", Nano Letters, [Online] vol. 16, No. 8, Aug. 10, 2016 (Aug. 10, 2016), pp. 4925-4931.

Peng Kun et al: "Distinguishing cap and core contributions to the photoconductive terahertz response of single GaAs based core-shell-cap nanowire detectors", Lithuanian Journal of Physics, [Online] vol. 58, No. 1, Mar. 28, 2018 (Mar. 28, 2018), pp. 15-23.

Bulgarevich Dmitry S. et al: "A polarization-sensitive 4-contact detector for terahertz time-domain spectroscopy", Optics Express, vol. 22, No. 9, May 5, 2014 (May 5, 2014), p. 10332.

B. B. Hu, M. C. Nuss, Imaging with Terahertz Waves. Opt Lett 20, 1716-& (1995).

N. C. J. van der Valk, W. A. M. van der Marel, P. C. M. Planken, Terahertz polarisation imaging. Opt Lett 30, 2802-2804 (2005).

S. Watanabe, Terahertz Polarisation Imaging and Its Applications. Photonics 5, (2018).

C. D. W. Mosley, M. Failla, D. Prabhakaran, J. Lloyd-Hughes, Terahertz spectroscopy of anisotropic materials using beams with rotatable polarisation. Scientific Reports 7, (2017).

Q. Chen, X. C. Zhang, Polarisation modulation in optoelectronic generation and detection of terahertz beams. Applied Physics Letters 74, 3435-3437 (1999).

D. S. Bulgarevich et al., Polarisation-variable emitter for terahertz time-domain spectroscopy. Optics Express 24, 27160-27165 (2016).

E. Castro-Camus et al., An ion-implanted InP receiver for polarisation resolved terahertz spectroscopy. Optics Express 15, 7047-7057 (2007).

E. Castro-Camus et al., Polarisation-sensitive terahertz detection by multicontact photoconductive receivers. Applied Physics Letters 86, 254102-254102 (2005).

H. Makabe, Y. Hirota, M. Tani, M. Hangyo, Polarisation state measurement of terahertz electromagnetic radiation by three-contact photoconductive antenna. Optics Express 15, 11650-11657 (2007).

N. Nemoto, T. Higuchi, N. Kanda, K. Konishi, M. Kuwata-Gonokami, Highly precise and accurate terahertz polarisation measurements based on electro-optic sampling with polarisation modulation of probe pulses. Optics Express 22, 17915-17929 (2014).

Hussain, S. R. Andrews, Ultrabroadband polarisation analysis of terahertz pulses. Optics Express 16, 7251-7257 (2008).

G. Niehues et al., A matter of symmetry: terahertz polarisation detection properties of a multi-contact photoconductive antenna evaluated by a response matrix analysis. Optics Express 23, 16184-16195 (2015).

K. Peng et al., Single n+-i-n+InP nanowires for highly sensitive terahertz detection. Nanotechnology 28, 125202 (2017).

Q. Gao et al., Selective-Area Epitaxy of Pure Wurtzite InP Nanowires: High Quantum Efficiency and Room-Temperature Lasing. Nano Letters 14, 5206-5211 (2014).

S. A. Baig et al., An Ultrafast Switchable Terahertz Polarisation Modulator Based on III-V Semiconductor Nanowires. Nano Letters 17, 2603-2610 (2017).

B. Guilhabert et al., Transfer Printing of Semiconductor Nanowires with Lasing Emission for Controllable Nanophotonic Device Fabrication. ACS Nano 10, 3951-3958 (2016).

E. Castro-Camus et al., Photoconductive response correction for detectors of terahertz radiation. J Appl Phys 104, 053113 (2008).

C. Y. Li, C. C. Chang, Q. L. Zhou, C. L. Zhang, H. T. Chen, Resonance coupling and polarisation conversion in terahertz metasurfaces with twisted split-ring resonator pairs. Optics Express 25, 25842-25852 (2017).

E. Castro-Camus, M. B. Johnston, Extraction of the anisotropic dielectric properties of materials from polarisation-resolved terahertz time-domain spectra. Journal of Optics A: Pure and Applied Optics 11, 105206 (2009).

Q. Gao et al., Simultaneous selective-area and vapor-liquid-solid growth of InP nanowire arrays, Nano Letters 16, 4361-4367 (2016).

N. Wang et al., Shape engineering of InP nanostructures by selective area epitaxy, ACS Nano 13, 7261-7269 (2019).

K. Peng et al., Distinguishing cap and core contributions to the photoconductive terahertz response of single GaAs based core-shell-cap nanowire detectors, Lithuanian Journal of Physics, vol. 58, No. 1, Mar. 28, 2018, pp. 15-23.

* cited by examiner

Fig. 7
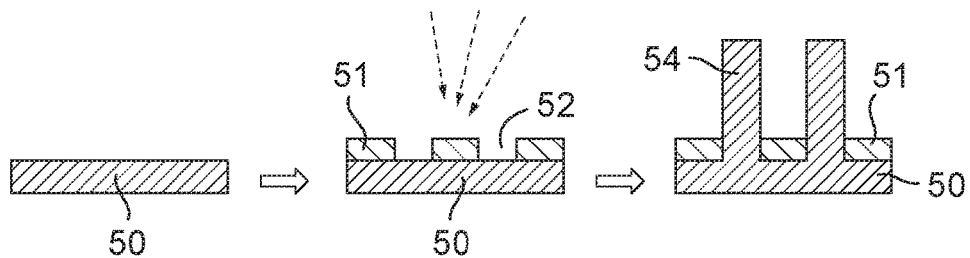
Fig. 8
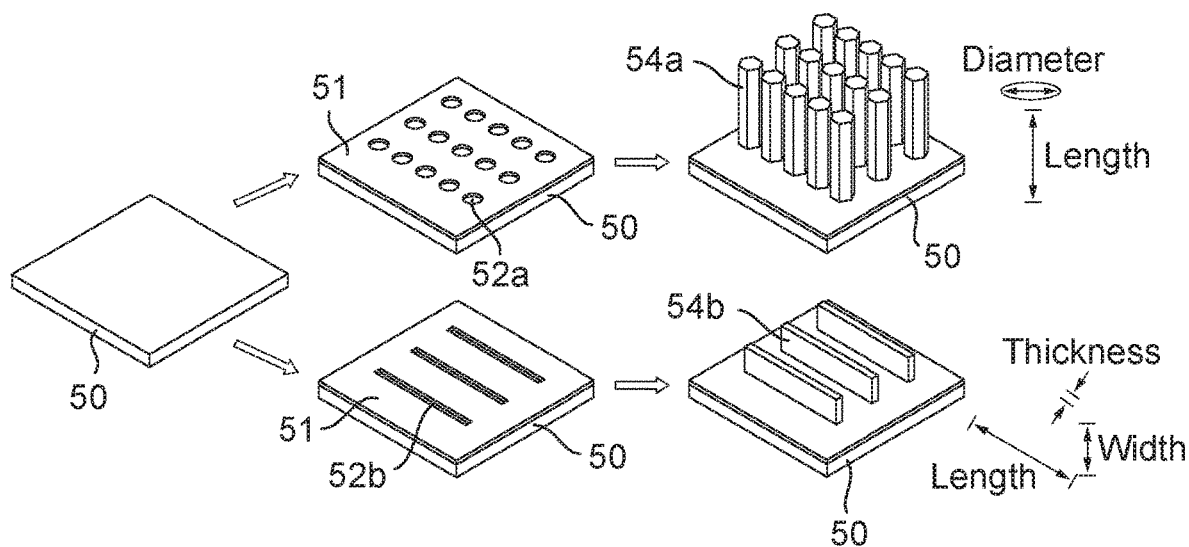
Fig. 9(a)   Fig. 9(b)
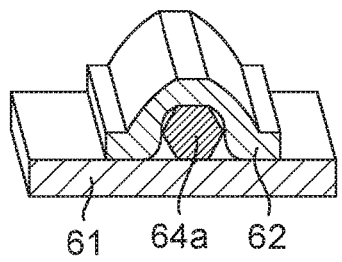 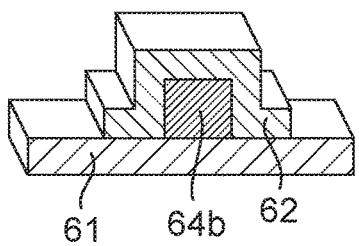

□ Horizontal (linearly)　　○ Horizontal (circularly)
○ Vertical (linearly)　　☆ Vertical (circularly)

TERAHERTZ ELECTROMAGNETIC RADIATION DETECTOR

CROSS-REFERENCE TO RELATED APPLICATIONS

This application is the National Stage of International Application No. PCT/GB2021/050480, filed Feb. 25, 2021, which claims priority to GB 2002640.7, filed Feb. 25, 2020, which are entirely incorporated herein by reference.

The present invention relates to a detector for detecting terahertz electromagnetic (EM) radiation.

Terahertz EM radiation encompasses a region of the electromagnetic spectrum between microwave and infrared (IR) light, with frequencies typically in the range from 0.1 THz to 30 THz. It is the band where electronics meets optics, with terahertz photons sharing properties from the neighbouring spectral regions. For example, in common with microwaves, terahertz EM radiation is non-ionizing and penetrates through most non-conducting materials, yet terahertz EM radiation can be handled by optical components like IR lights. This mixed property is enabling a wide variety of terahertz applications including wireless communication, spectroscopy, sensing and imaging.

For brevity, herein the term "terahertz" may be used in context as an abbreviation to refer to terahertz electromagnetic (EM) radiation.

By way of non-limitative example, time-domain spectroscopy (TDS) with single or sub-cycle pulses of terahertz EM radiation is a powerful tool for materials characterization, since it directly measures both the amplitude and phase of EM radiation over a broad frequency band, thereby allowing straightforward extraction of the complex dielectric properties. The pulsed nature of the technique also allows tomographic 3D spatial mapping of dielectric properties of materials using a methodology similar to radar (Reference 1). Such spectral imaging has been applied in a wide range of applications including pharmaceutical quality control, medical diagnostics and production-line inspection. Furthermore the pulsed nature of the TDS technique facilitates studying dynamic process in materials with femtosecond time resolution. For example, the technique of optical pump/terahertz probe spectroscopy (OPTPS), also known as time-resolved terahertz-TDS, is a contact-free probe of electrical conductivity and charge dynamics in semiconductors that allows quantification of key charge recombination parameters such as Shockley-Read-Hall, bimolecular and Auger recombination constants.

The vast majority of TDS systems in the terahertz field are based on generation and detection of linearly-polarized single-cycle terahertz pulses. Detectors have been developed in previous studies (References 14-16) for detecting terahertz electromagnetic radiation incident along a direction of incidence. These previous detectors have comprised a substrate and a detector element supported on the substrate, wherein the detector element comprises a pair of antenna elements having a gap therebetween, and a switch element comprising one or more pieces of photoconductive semiconductor material connected between the antenna elements across the gap. The antenna elements are configured so that, when the switch element is conductive, current is generated between the antenna elements by one linear polarisation component of terahertz electromagnetic radiation incident on the detector switch element.

The first aspect of the present invention is concerned with simultaneous detection of perpendicular polarisation components of incident terahertz electromagnetic radiation. Detection of perpendicular polarisation components provides information about the polarisation state of terahertz pulses which has many potential applications. For example, information about the polarisation state of a terahertz pulse allows a thorough understanding of the anisotropic dielectric properties of materials, which could for example be affected by surface topography, crystal structure, stress and magnetic fields, and has led to new techniques such as terahertz optical-Hall effect, terahertz ellipsometry and vibrational circular dichroism spectroscopy.

In pulsed terahertz imaging applications (References 2, 3), polarisation information helps to correct the artificial absorption features caused by the material birefringence or the enhanced scattering from sample edges, resulting in higher spatial resolution. Therefore, the capability allowing polarisation measurement with terahertz-TDS is in high demand. In fact, polarisation-resolved terahertz-TDS systems have been demonstrated (Reference 1) since the late 1990s. However, a lack of measurement schemes for fast and precise polarisation sensing has impeded its application.

Currently, polarisation detection in terahertz-TDS can be realized either using wire-grid terahertz polarizers (with limited bandwidth), rotatable polarisation terahertz sources (References 4-6) (requiring a perfectly aligned system to the rotation axis) or polarisation-sensitive detectors (References 7-11). In most cases, only one component of the terahertz electric field vector can be measured over one time-domain scan. For determining the full polarisation state, doubled data acquisition time is required, which is a problematic for most imaging applications. Utilization of a multi-contact photoconductive antenna (References 8, 9, 12) for polarisation-sensitive measurement is an exceptional case, since this detector type is capable of simultaneously measuring the terahertz electric field vector along two orthogonal (or multiple) directions through a single time-domain scan. However, these devices are difficult to align. Also, the characteristic of crosstalk between detection channels in such detectors introduces complexity to extraction of the polarisation state (References 9, 13), which has limited their practical use. Therefore there is still a need for improved polarisation detection in terahertz-TDS to provide a practical solution, which would provide easier set up and analysis, while maintaining fast acquisition times and high precision.

According to the first aspect of the present invention, there is provided a detector for detecting terahertz electromagnetic radiation incident along a direction of incidence, the detector comprising: a substrate; and a pair of detector elements supported on the substrate, the detector elements being electrically isolated from each other, each detector element comprising: a pair of antenna elements having a gap therebetween; and a switch element comprising one or more pieces of photoconductive semiconductor material connected between the antenna elements across the gap, the pairs of antenna elements of the respective detector elements being configured so that, when the switch element is conductive, current is generated between the antenna elements by polarisation components of incident terahertz electromagnetic radiation having polarisation directions in respective sensing directions that are transverse.

This provides a detector having a relatively simple construction that may simultaneously detect perpendicular polarisation components of incident terahertz electromagnetic radiation, thereby enabling fast and precise detection of the full polarisation state of the incident terahertz electromagnetic radiation.

The present detector provides advantages over other methods of detecting terahertz polarisation information.

Compared to sequential measurements that require change of optics (e.g. rotation of detector, emitter, polariser and/or electro-optic crystal), or electrically switching between emitters with different polarisation, the present detector is less sensitive to alignment of the terahertz EM radiation detection apparatus and is more rapid due to the parallel detection of polarisation components. Compared to beam splitting techniques where the terahertz beam is split into two separate beams by a polarising or non-polarising beamsplitter and the two beams analysed in orthogonal polarisation directions, the present detector is less sensitive to alignment of the terahertz EM radiation detection apparatus and a lot more compact.

Previous terahertz EM radiation detector designs (References 14-16) used a switch element comprising semiconductor nanowires as a photoconductive switch between a pair of antenna elements. However, this design could only detect the polarisation component in a single direction. In the present design, choosing a linearly polarised antenna design and overlaying two detector elements on the same substrate at an angle to each other allows the two detector elements to operate simultaneously in the same plane. The switch elements comprising nanowires make sure the two detector elements are electrically isolated, which avoids the problem of electrical cross talk that existed in previous designs, and made them extremely alignment sensitive. The present detector may be used to extend the capabilities of existing terahertz spectrometers and terahertz imaging systems, or to create new instruments such as terahertz polarimeters, terahertz ellipsometers or terahertz circular dichroism spectrometers The respective sensing directions are preferably perpendicular, as this allows the perpendicular polarisation components to be directly detected by the respective detector elements, thereby minimising crosstalk. However, in principle, any transverse sensing detections could be used as the detected, transverse polarisation components could be resolved into perpendicular polarisation components by transforming the detected signals.

The switch element of each detector element may comprise an array of pieces of photoconductive semiconductor material, for example an array of nanowires of photoconductive semiconductor material.

The switch elements of the pair of detector elements may cross as viewed along an axis parallel to the direction of incidence and are electrically isolated from each other.

The antenna elements of the pair of detector elements may be disposed around the axis without overlap along the direction of incidence. Such an arrangement has the benefit of reducing cross-talk between the detector elements.

The pair of antenna elements of each detector element may have a bow-tie arrangement. Such an arrangement is known for a single detector element. However, when applied to the present detector in a case where the switch elements cross along an axis parallel to the direction of incidence, a bow-tie arrangement for the electrodes has the benefit of permitting the electrodes to be conveniently arranged around the axis.

The detector may comprise plural pairs of detector elements in an array. This permits detection of terahertz EM radiation at the location of each detector element, thereby providing spatial imaging of the terahertz EM radiation.

The or each piece of photoconductive semiconductor material may have a thickness in a direction along an axis parallel to the direction of incidence in a nanometre scale range, for example less than 1000 nm, and typically 500 nm or less. The or each piece of photoconductive semiconductor material may be a nanowire of photoconductive semiconductor material. This permits the detector to be manufactured using similar techniques to those applied to known terahertz EM radiation detectors including a single detector element that includes a switch element comprising one or more nanowires of photoconductive semiconductor material. Such a nanowire may have a hexagonal cross-section.

However, as an alternative, the or each piece of photoconductive semiconductor material may be formed as a strip of photoconductive semiconductor material. Such a strip may have a greater width than a nanowire in a direction perpendicular to the axis. Such a strip may have a rectangular cross-section. Such a strip may have a ratio of width in a direction perpendicular to the axis to thickness in a direction along the axis that is at least two, preferably at least ten.

Compared to a nanowire, the use of the strip of photoconductive semiconductor material leads to two benefits, either or both of which may be important in a given application. The first benefit is that strips of photoconductive semiconductor material may be manufactured to provide a longer length of detection material and in turn a wider detection gap. This allows a larger volume of photoconductive semiconductor material, and thus higher signal size. The second benefit is that the contact area for current flow between the metal of the semiconductor material may be larger in the case of strip of photoconductive semiconductor material than in the case of nanowires.

The second aspect of the present invention is concerned with the characteristics of a detector for detecting terahertz electromagnetic radiation.

According to the second aspect of the present invention, there is provided a detector for detecting terahertz electromagnetic radiation incident along a direction of incidence, the detector comprising: a substrate; and at least one detector element supported on the substrate, the detector element comprising: a pair of antenna elements having a gap therebetween; and a switch element comprising a strip of photoconductive semiconductor material connected between the antenna elements across the gap, the antenna elements being configured so that, when the switch element is conductive, current is generated between the antenna elements by incident terahertz electromagnetic radiation.

The strip may have a greater width than a nanowire in a direction perpendicular to an axis parallel to the direction of incidence. Compared to a similar detector that uses a nanowire, the use of the strip of photoconductive semiconductor material leads to two benefits, either or both of which may be important in a given application. The first benefit is that strips of photoconductive semiconductor material may be manufactured to provide a longer length of detection material and in turn a wider detection gap. This allows a larger volume of photoconductive semiconductor material, and thus higher signal size. The second benefit is that the contact area for current flow between the metal of the semiconductor material may be larger in the case of strip of photoconductive semiconductor material than in the case of nanowires.

The strip of photoconductive semiconductor material may have a thickness in a direction along an axis parallel to the direction of incidence in a nanometre scale range, for example less than 1000 nm, and typically 500 nm or less. Such a strip may have a rectangular cross-section. Such a strip may have a ratio of width in a direction perpendicular to the axis to thickness in a direction along the axis that is at least two, preferably at least ten.

The following comments apply to both aspects of the present invention. In use, the detector may further comprise a detection circuit connected to the antenna elements of each detector element for detecting the generated current.

The detector may be incorporated in a terahertz EM radiation detection apparatus that further comprises a terahertz electromagnetic radiation system arranged to direct terahertz electromagnetic radiation onto the detector along the direction of incidence; and a control system arranged to direct light onto the detector for controlling the conductivity of the switch element. The terahertz electromagnetic radiation system and the control system may be arranged in a similar manner to known terahertz EM radiation detection apparatus Such an apparatus may, for example, be arranged to perform time domain spectroscopy.

To allow better understanding, an embodiment of the present invention will now be described by way of non-limitative example with reference to the accompanying drawings, in which:

FIGS. 7 and 8 are a schematic side and perspective views, respectively, of steps in a process of manufacturing nanostructures using catalyst-free selective-area metal-organic epitaxy (SA-MOVPE);

Figure 1:
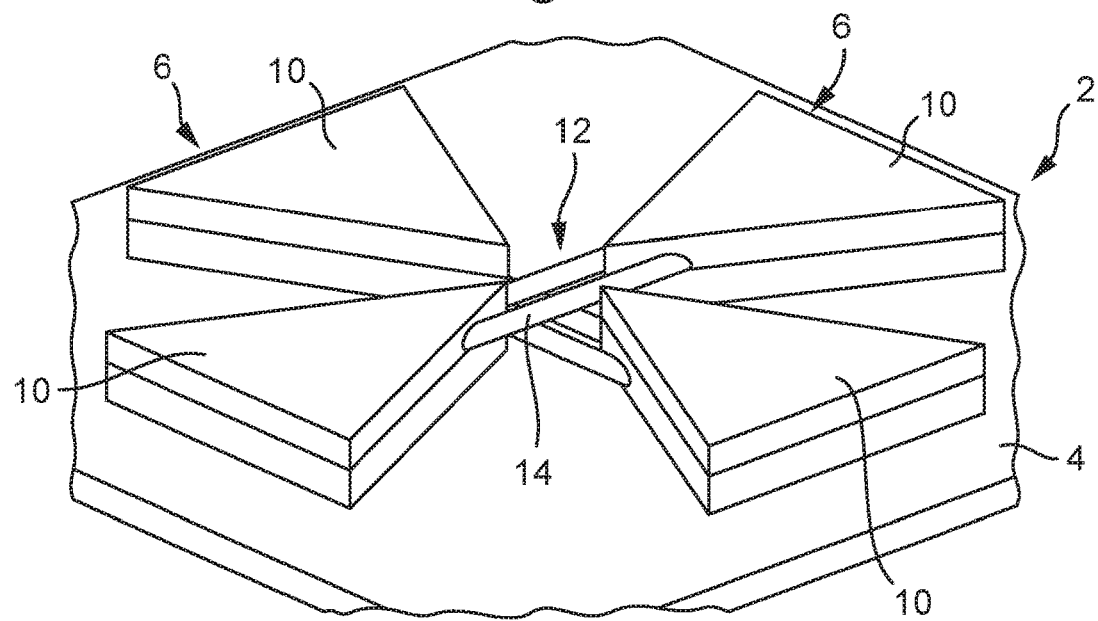
FIG. 1 is a schematic of the structure of a detector comprising nanowires of photoconductive semiconductor material.
Figure 2:
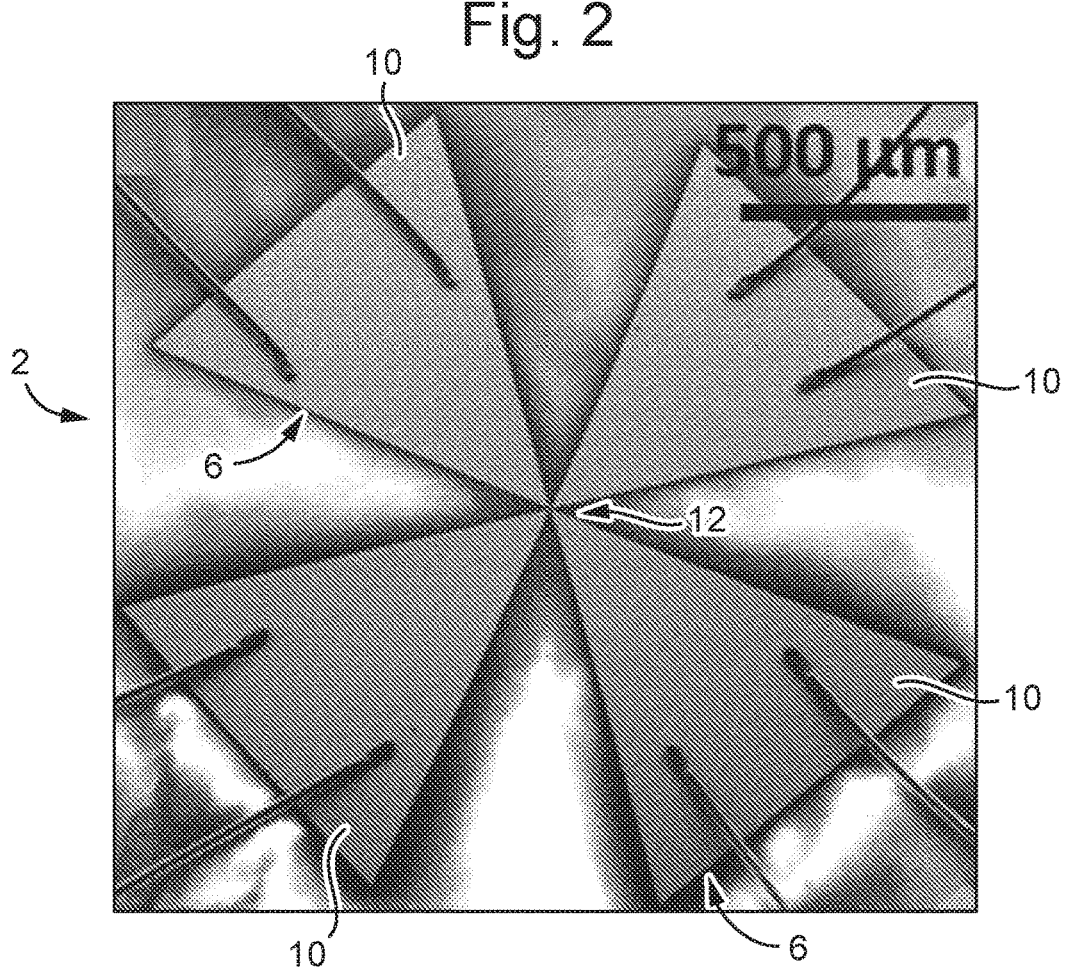
FIG. 2 is a scanning electron microscope image of a detector of the type shown schematically in FIG. 1.
Figure 10:
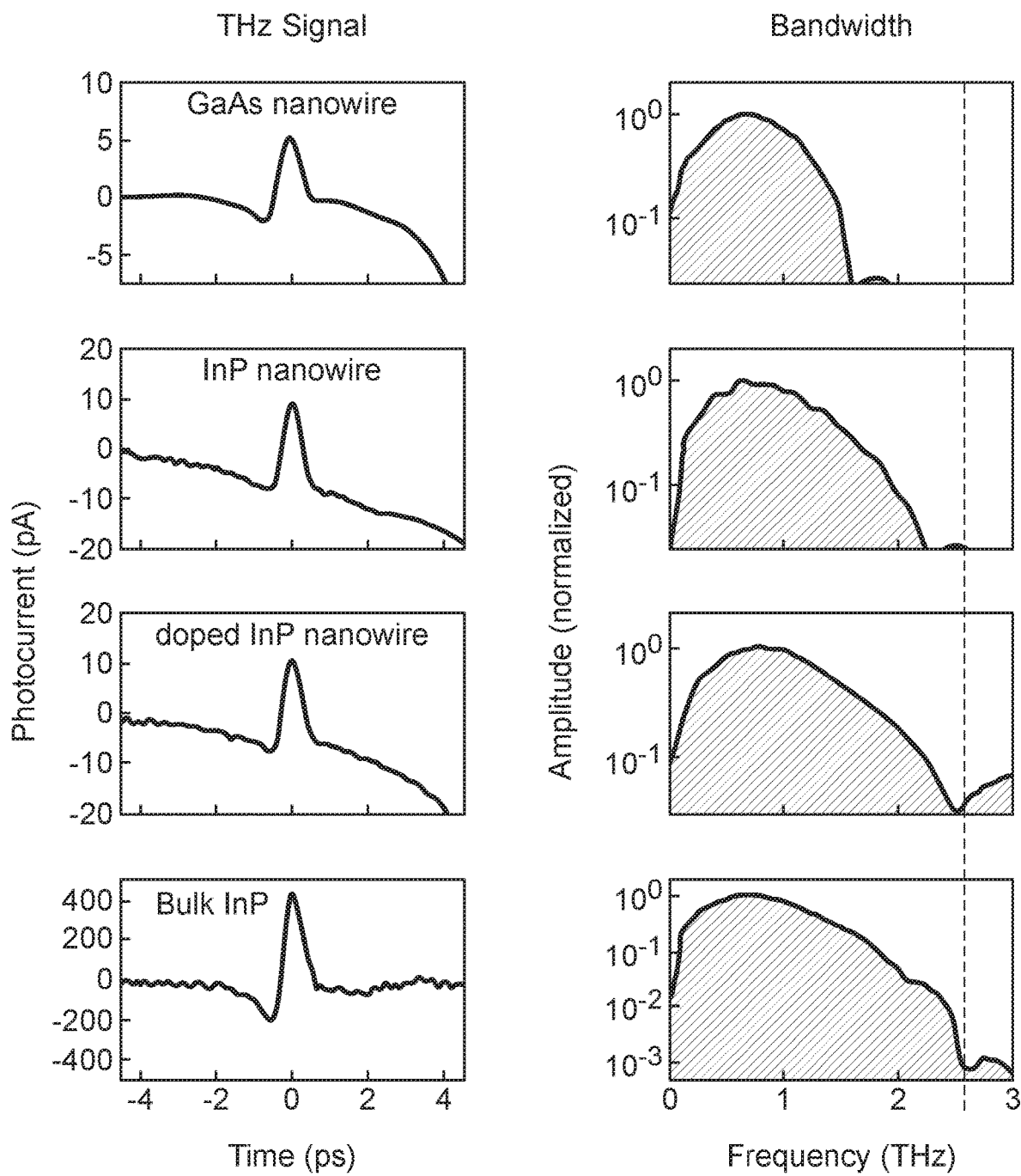
Figure 11:
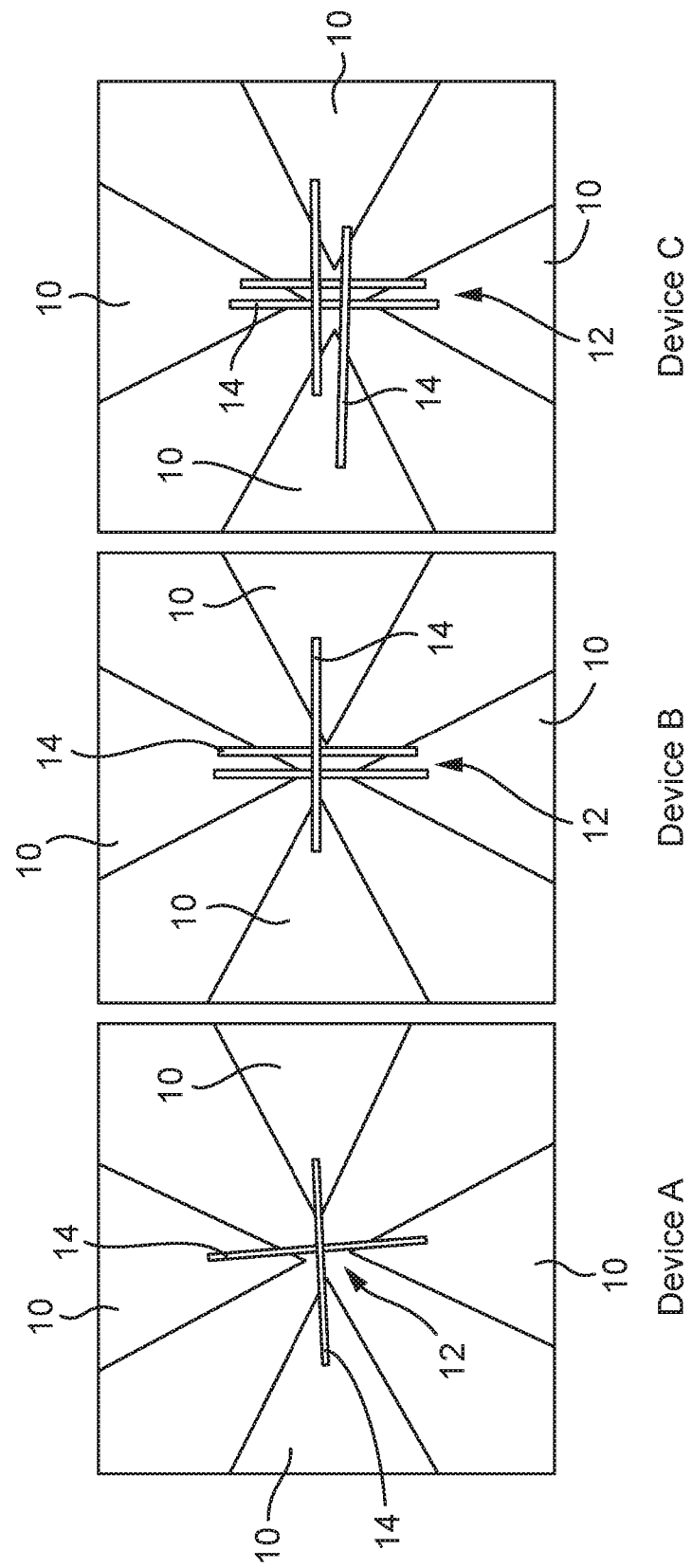
Figure 12:
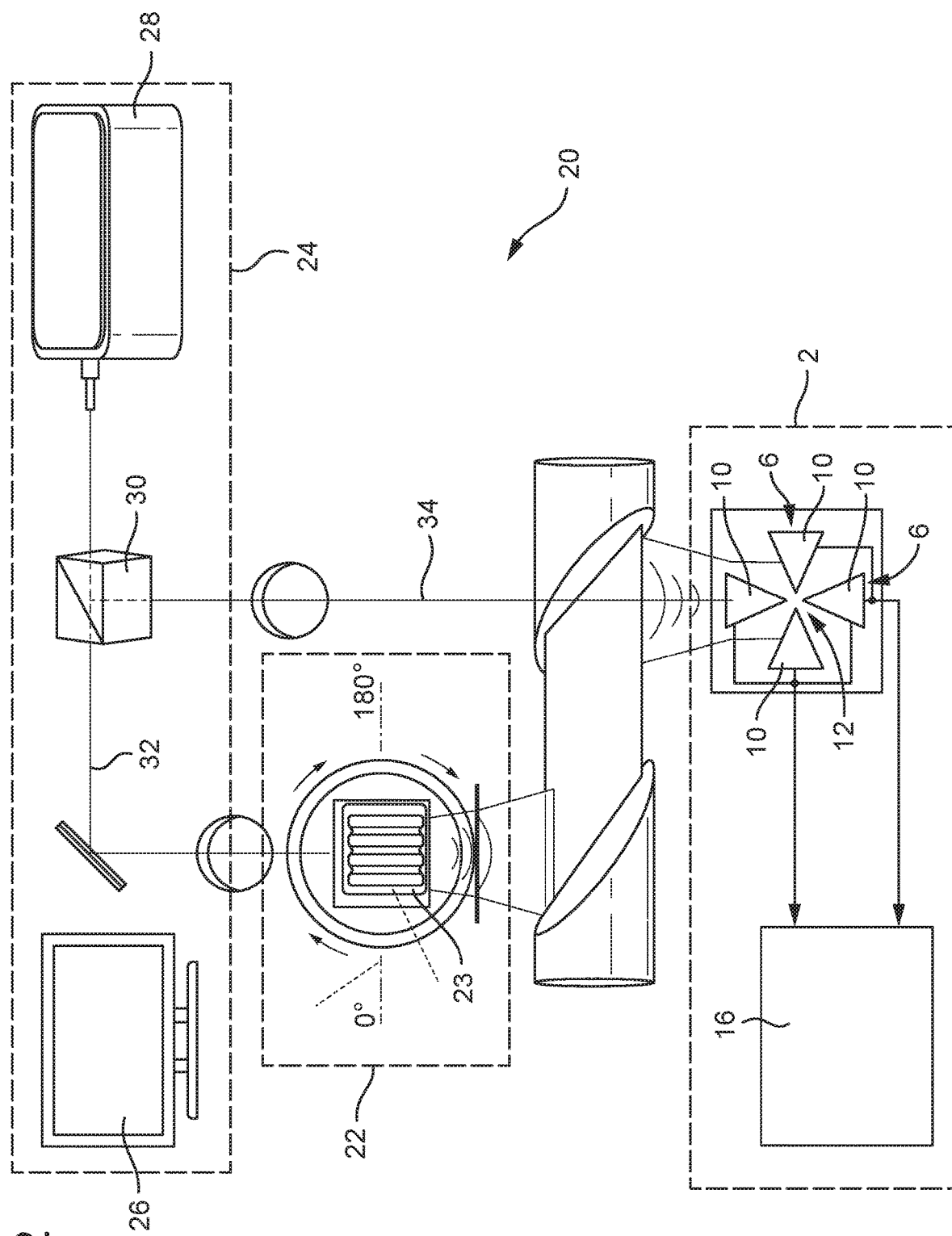
Figure 13:
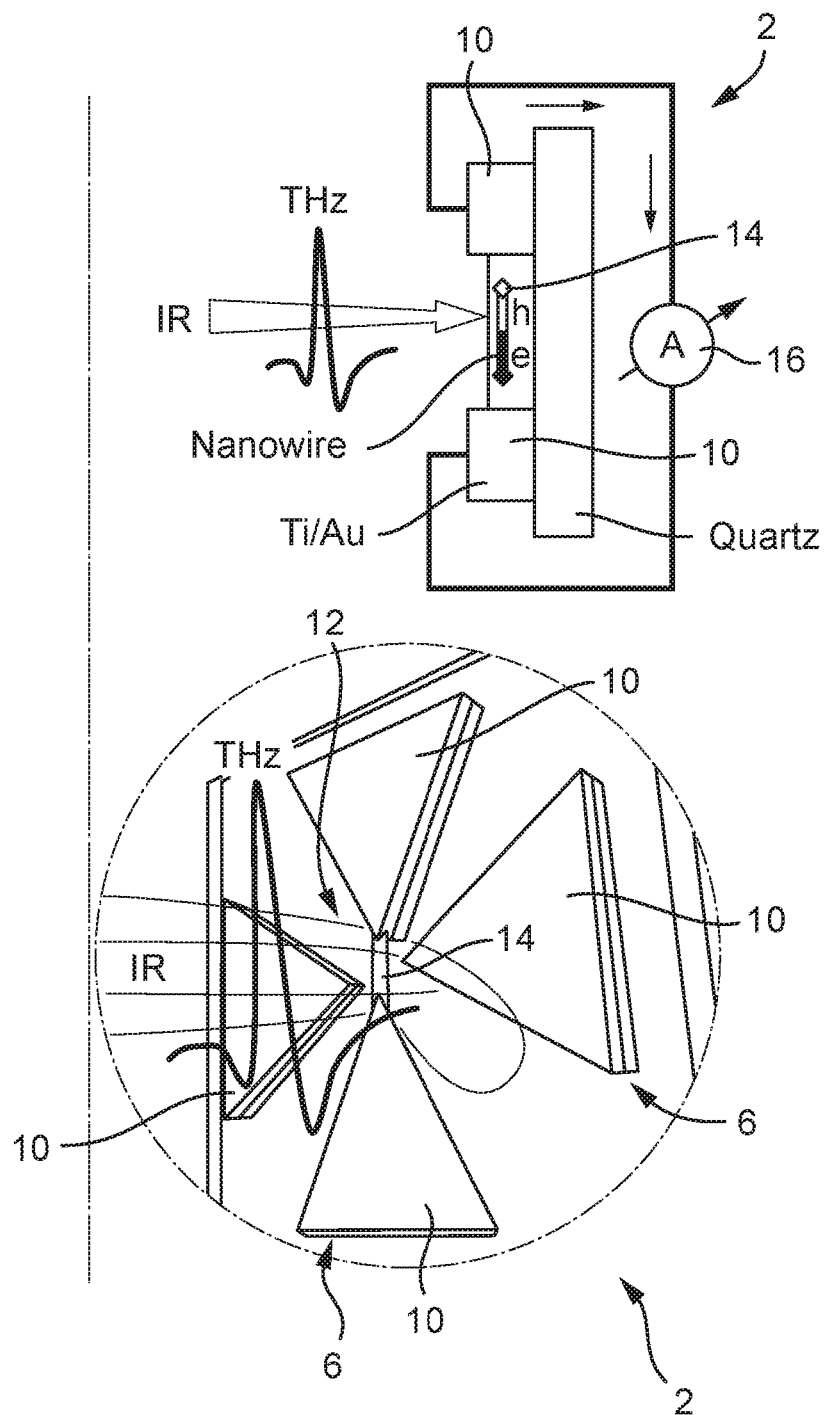
Figure 14:
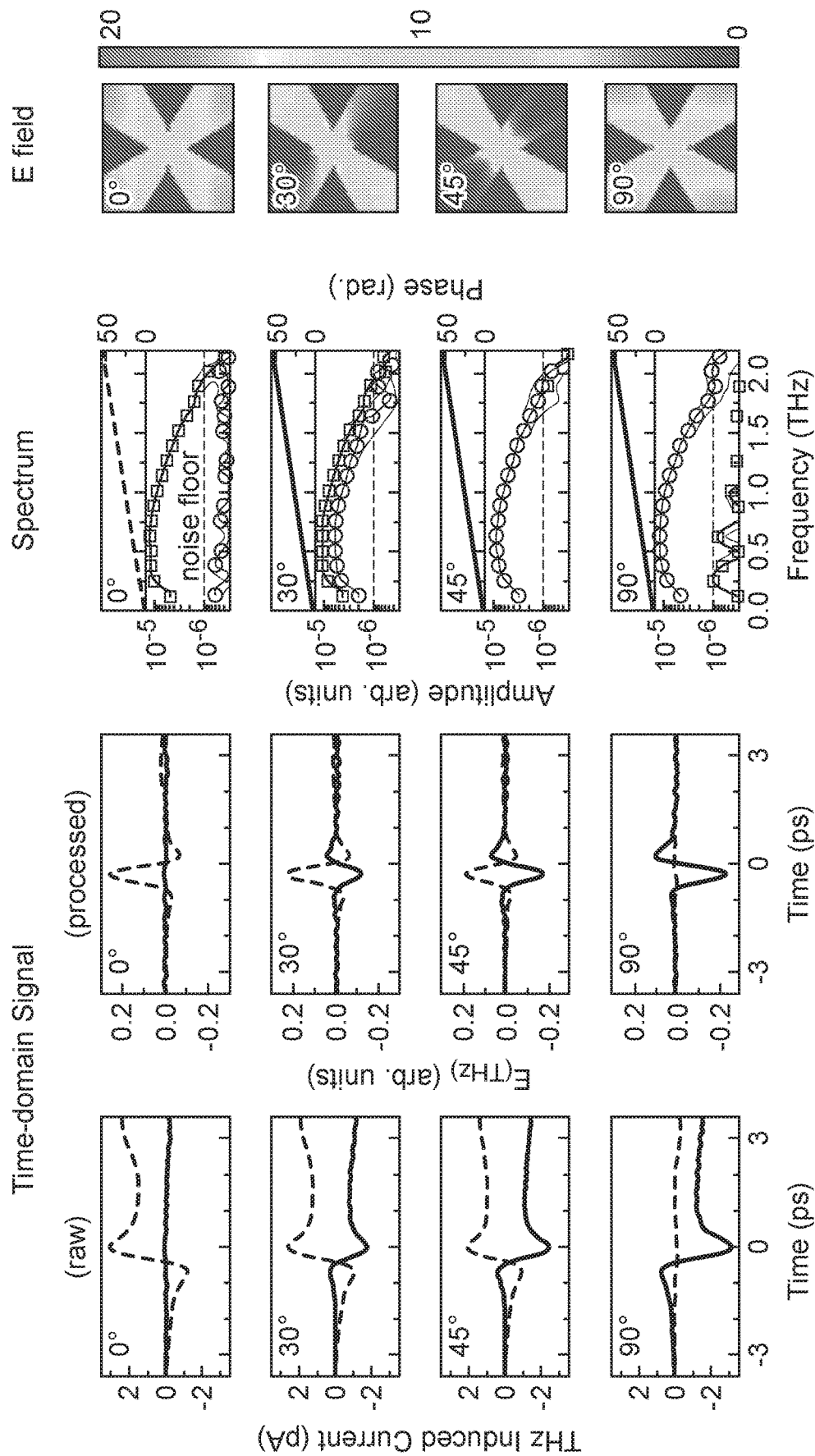
Figure 15:
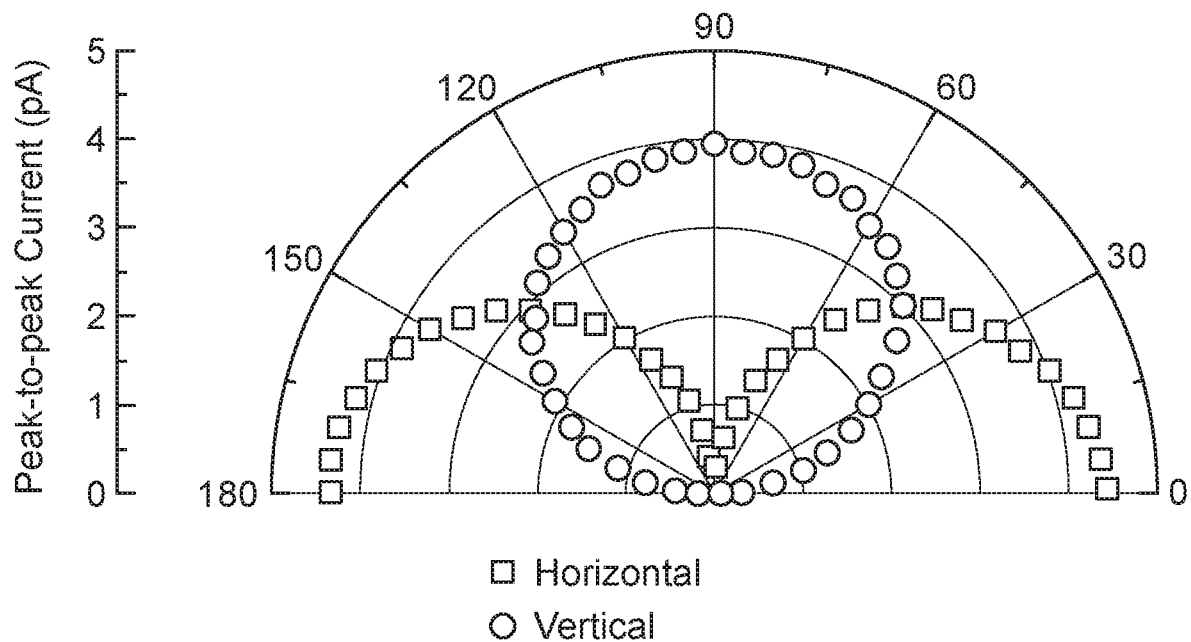
Figure 16:
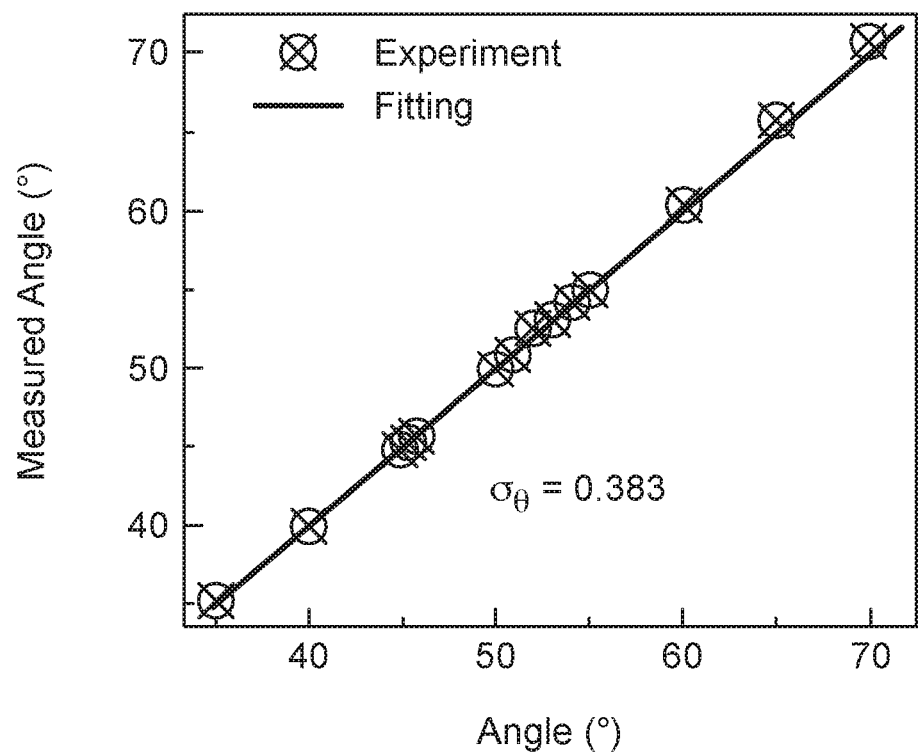
Figure 17:
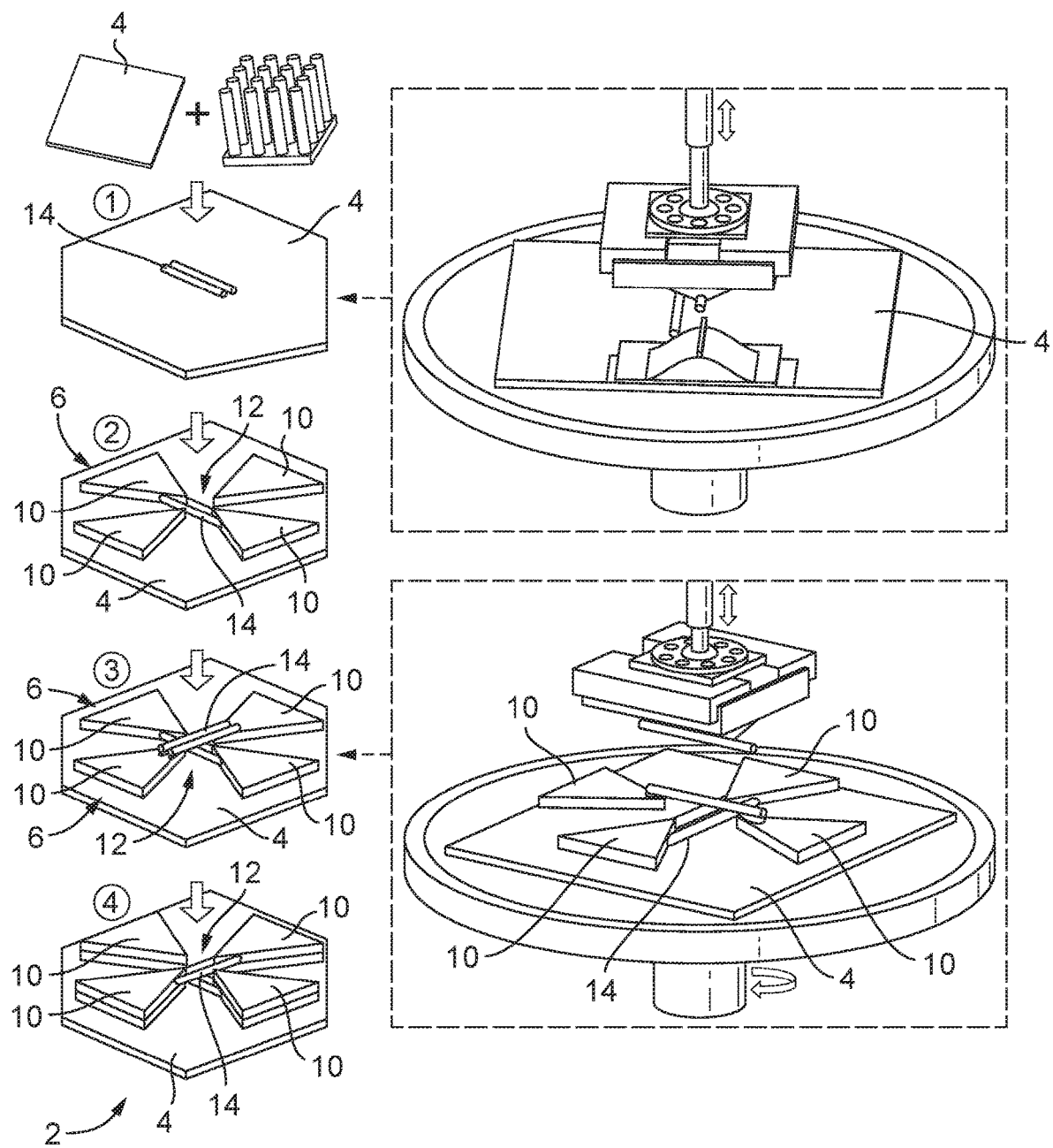
Figure 18:
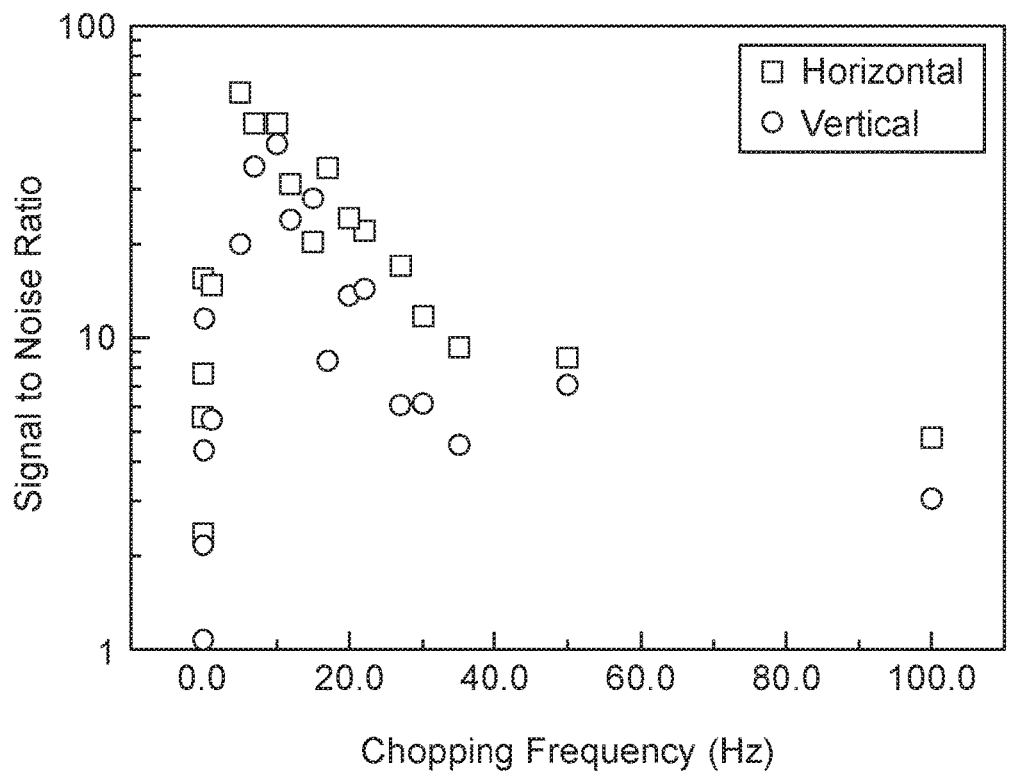
Figure 19:
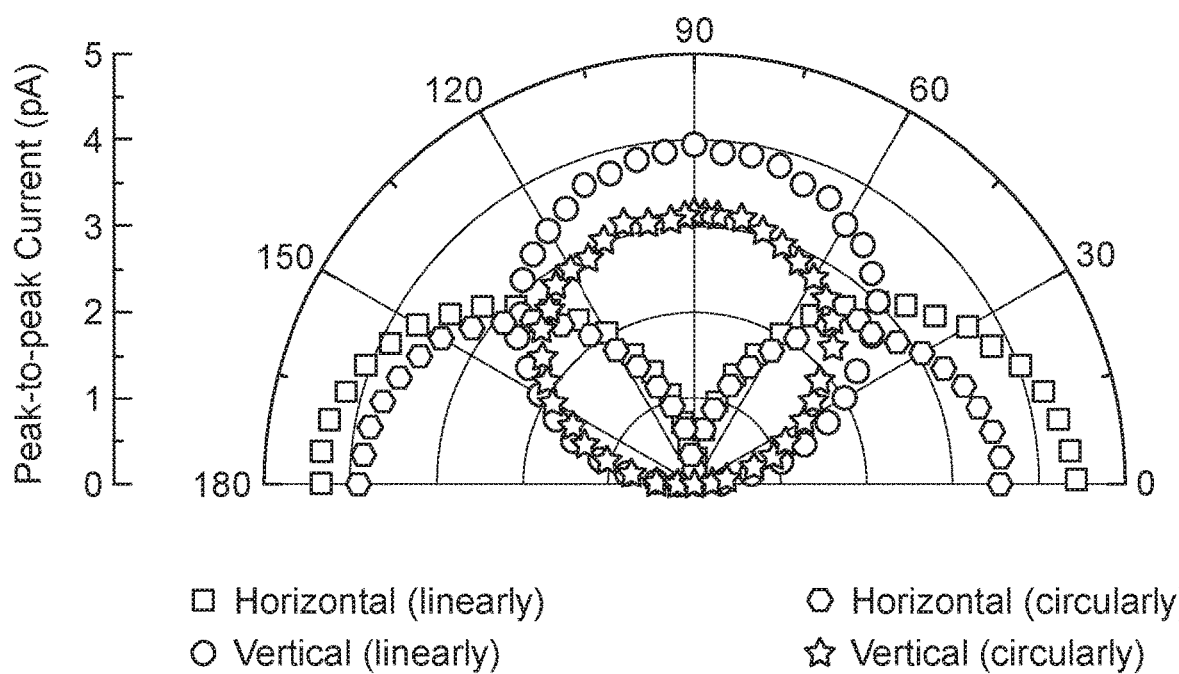
Figure 20:
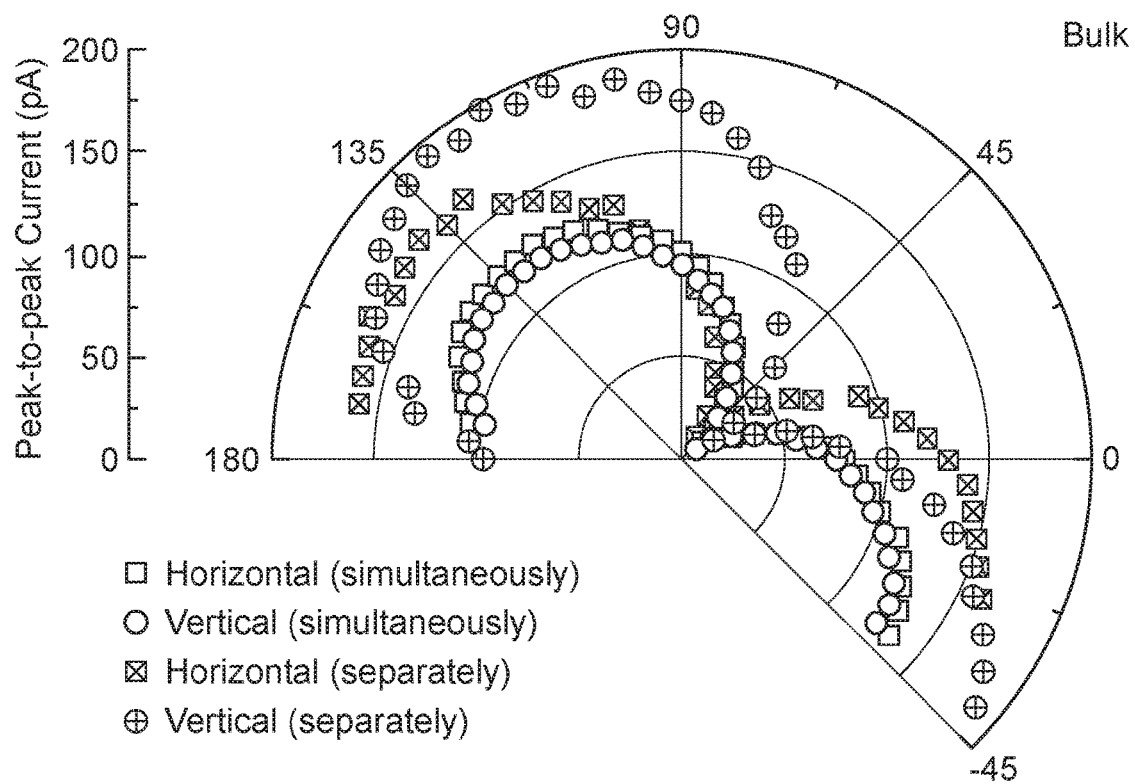
Figure 21:
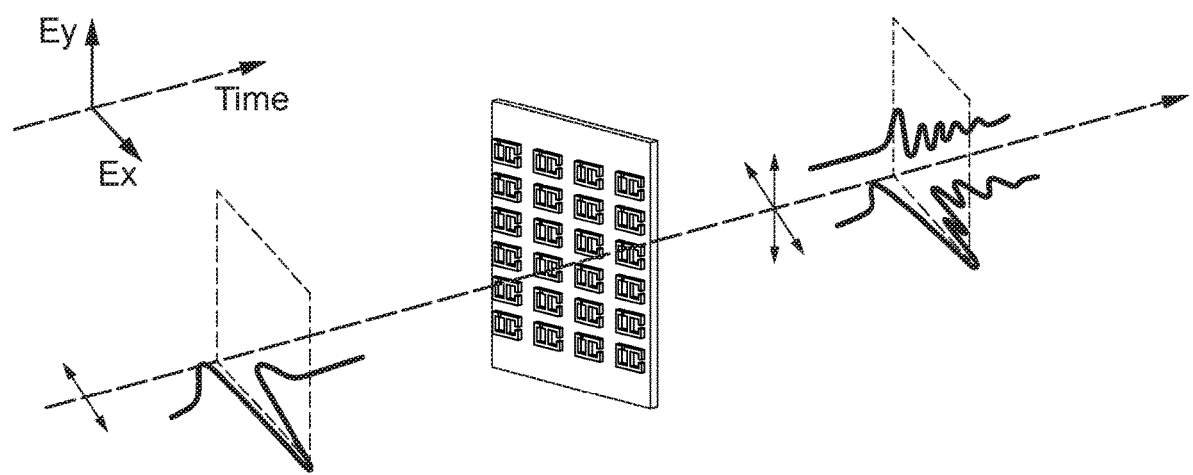
Figure 22:
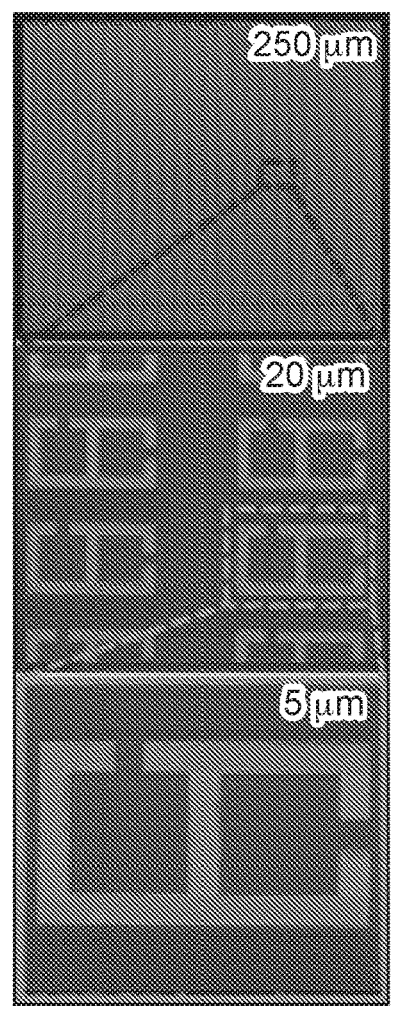
Figure 23:
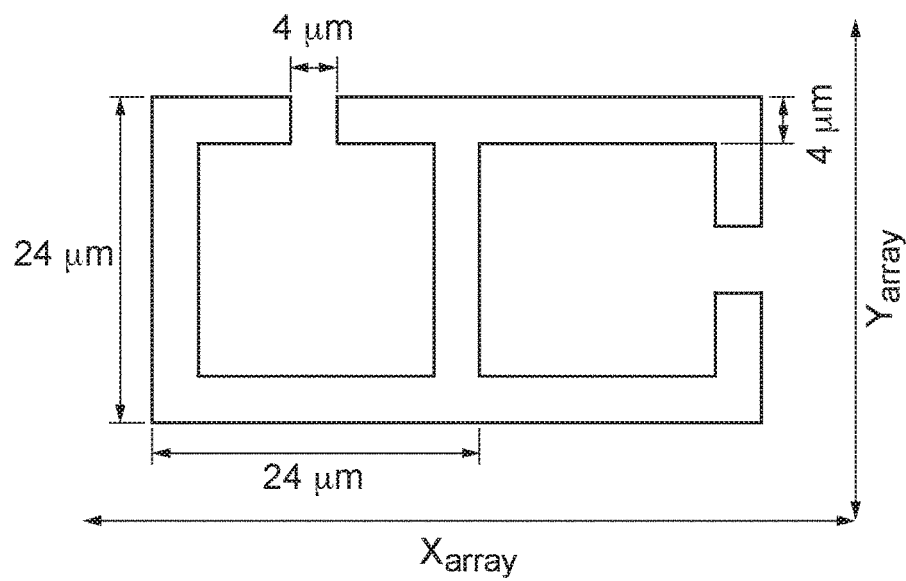
Figure 24:
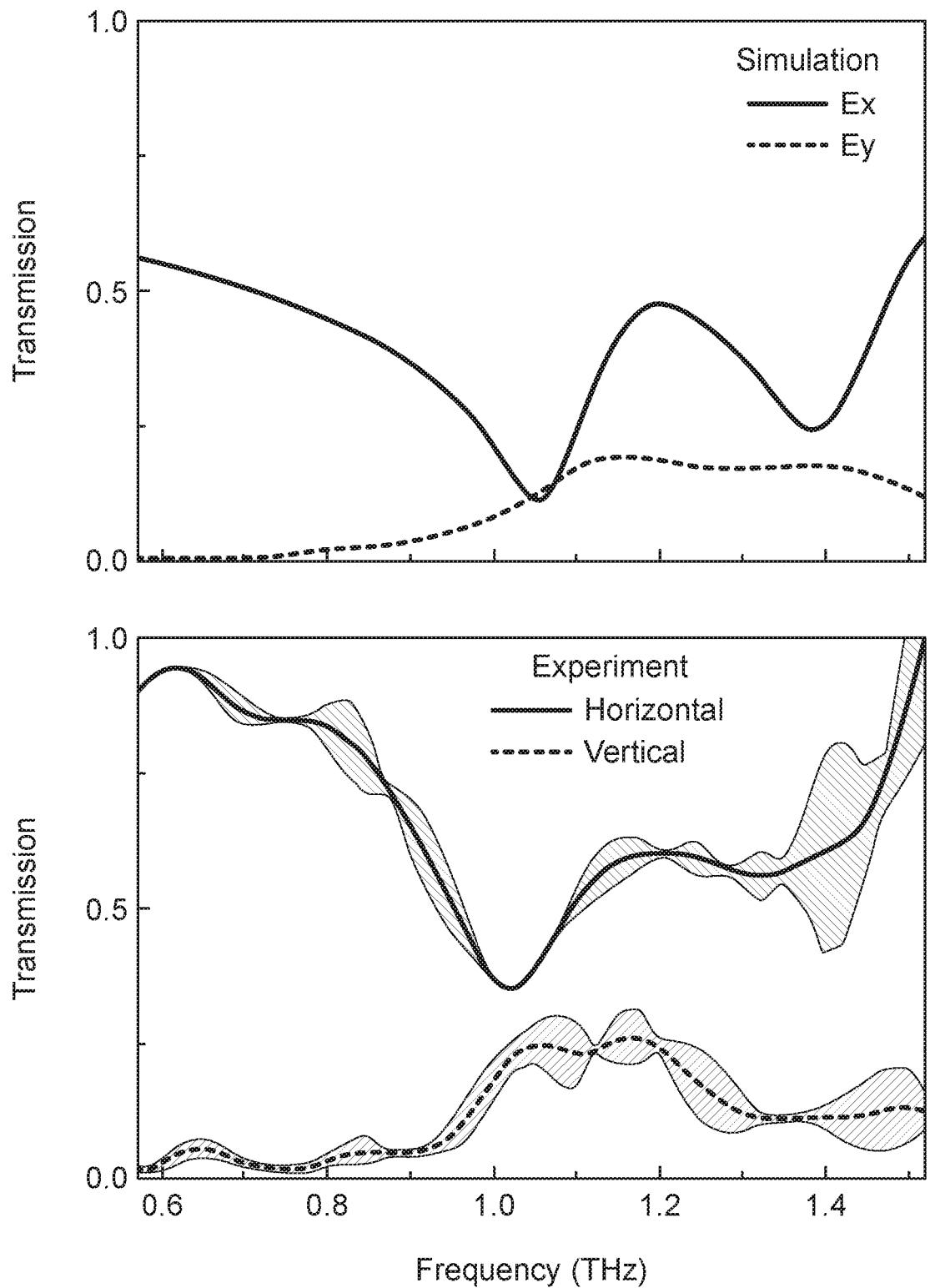
Figure 25A:
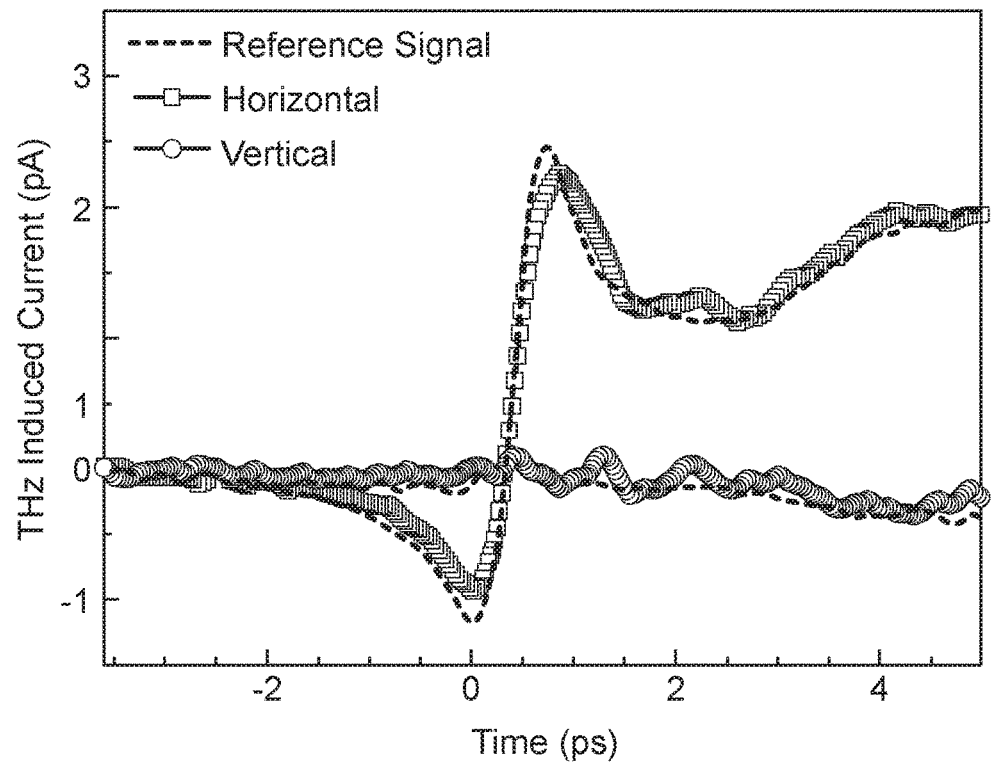
Figure 25B:
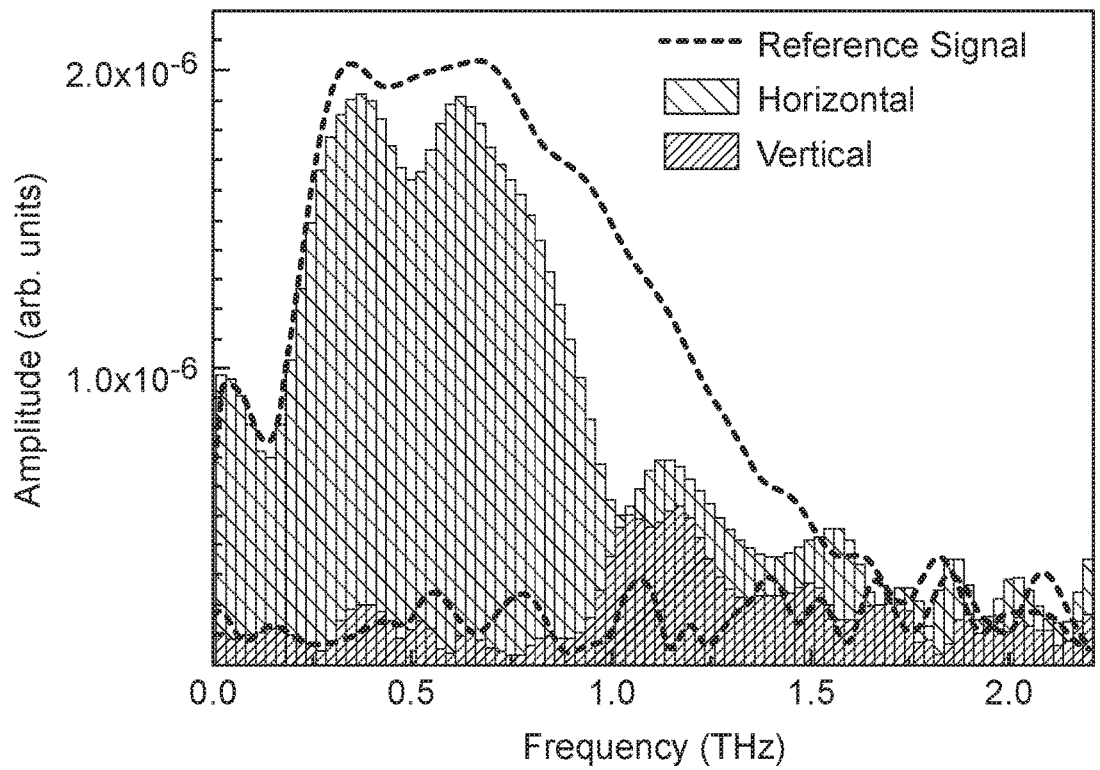
Figure 27A:
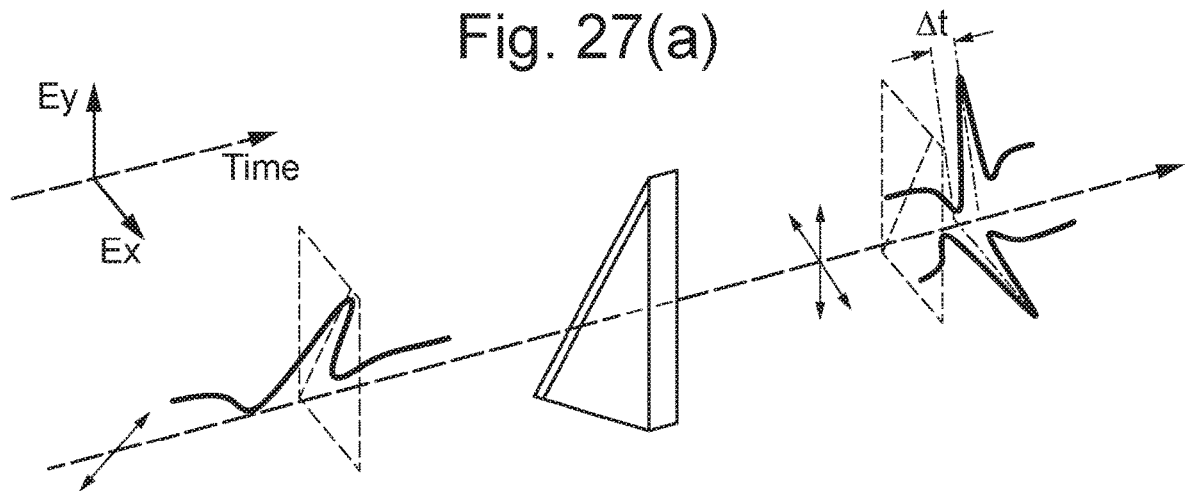
Figure 28:
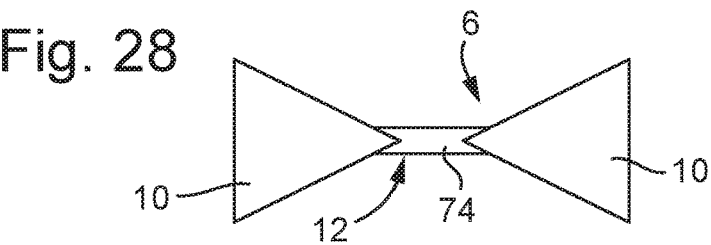
Figure 29:
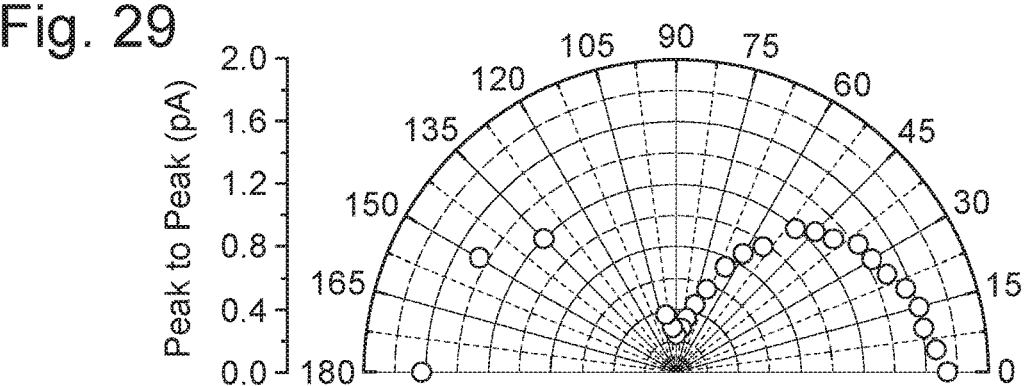

FIGS. 9(a) and (b) are perspective sectioned views of a nanowire and a nanostrip, respectively, within deposited layers of an antenna element;

FIG. 10 is a set of graphs of the THz signal and bandwidth, respectively, of a detector element comprising a single nanowire of four different semiconductor materials;

FIG. 11 shows detectors fabricated with differing numbers of nanowires;

FIG. 12 is a schematic of a terahertz-time domain spectroscopy apparatus incorporating a detector of the type shown schematically in FIG. 1;

FIG. 13 is a schematic of illustration of the detector in operation;

FIG. 14 shows the results of characterisation measurements on the spectral response of the detector of FIG. 2;

FIG. 15 shows the results of characterisation measurements on the crosstalk between the two detector elements of the detector of FIG. 2;

FIG. 16 shows the results of characterisation measurements on the angle measured by the detector of FIG. 2;

FIG. 17 shows a process for manufacturing the detector of FIG. 2;

FIG. 18 shows results of measurements on the effect of the terahertz emitter chopping frequency on the detector signal-to-noise ratio;

FIG. 19 shows a comparison of the response of the detector to linearly polarized pulses and circularly polarized pulses;

FIG. 20 shows the effect of crosstalk between the two detection channels in a prior art detector;

FIG. 21 is a schematic of the measurement setup for measuring a terahertz metamaterial using the detector;

FIG. 22 shows scanning electron microscope images at increasing magnification of a terahertz metamaterial;

FIG. 23 is a schematic of the terahertz metamaterial of FIG. 22;

FIG. 24 shows measured and simulated transmission spectra of the metamaterial of FIGS. 22 and 23;

FIG. 25 shows raw data measured using the detector used to derive the measured spectra of FIG. 24;

FIGS. 26A to D show transmission measurements of an x-cut quartz crystal measured using the detector;

FIG. 27 shows spectra of an x-cut quartz crystal determined using measurements made using the detector;

FIG. 28 is an image of a detector element comprising a photoconductive switch element that is a nanostrip;

FIG. 29 shows the response of the detector element shown in FIG. 28; and

Figure 30:
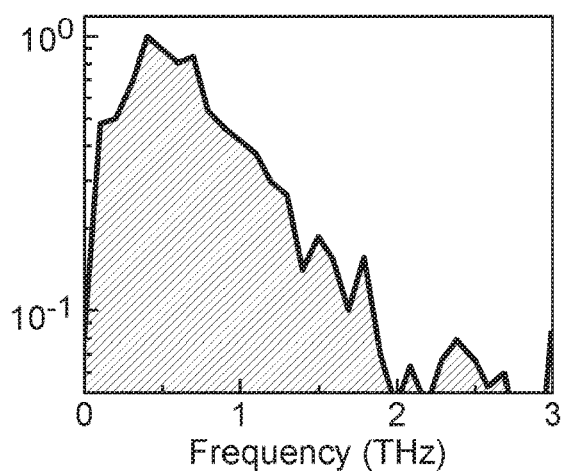
Figure 31:
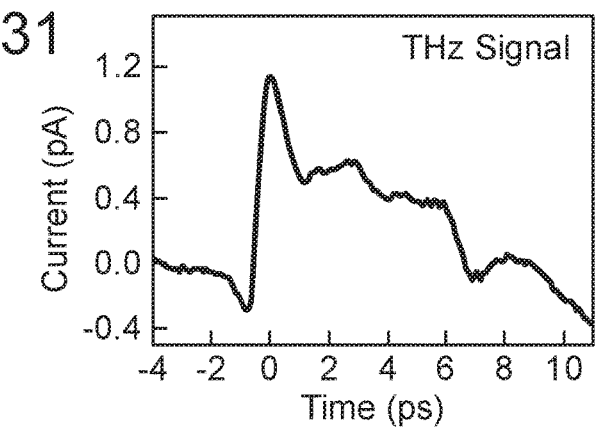

FIGS. 30 and 31 are graphs of the THz signal and bandwidth of a detector element.

Recording the electric field of single-cycle pulses of terahertz radiation in the time domain has proved particularly powerful in both fundamental scientific research, and for applications such as security screening, communications, quality control and medical imaging. However, to date most time-domain terahertz detectors are sensitive to just one polarisation of terahertz light, which causes half the information contained within each terahertz pulse to be lost. To address this problem, there is disclosed herein a new detector design enabling the measurement of the polarisation of terahertz-frequency electromagnetic radiation in full.

The detector 2 disclosed herein is a monolithic semiconductor detector based on cross-nanowire networks that records the full polarisation state of terahertz pulses. This detector 2 allows simultaneous measurements of the orthogonal components of the terahertz electric field vector without crosstalk between the components, which has affected previous detector designs. The detector 2 is also much less sensitive to alignment compared with previous approaches, making the detector 2 much easier to integrate into a variety of applications. This has been achieved by introducing nanotechnology to terahertz technology, creating a unique polarisation-sensitive terahertz detector with capability beyond that of conventional approaches. The detector 2 is based on detector elements 6 comprising photoconductive switch elements 12, which are the most popular detector type employed in custom-made and commercial terahertz-TDS systems. Therefore, the detector 2 shares the same operating mechanism and data analysis techniques as widely used existing detectors, and can be easily implemented in industrial applications.

FIG. 1 shows a schematic illustration of the structure and geometry of the detector 2. The detector 2 is a polarisation-sensitive terahertz nanowire detector for detecting terahertz electromagnetic radiation incident along a direction of incidence. Throughout this description, the detector 2 may be referred to as a nanowire detector 2 in some contexts to prevent ambiguity when making comparisons to other known designs of terahertz EM radiation detector. However, as discussed further below, the detector 2 is not in general limited to the use of nanowires.

The detector 2 comprises a substrate 4, and a pair of detector elements 6 supported on the substrate 4, the detector elements 6 being electrically isolated from each other. The substrate 4 is quartz, but may alternatively be made of any suitable electrically insulating material, for example an insulating plastic. This assists in providing electrical isolation between the detector elements 6. The detector 2 may comprise plural pairs of detector elements 6 in an array. This permits detection of terahertz EM radiation at the location of each detector element 6, thereby providing spatial imaging of the terahertz EM radiation.

Each detector element 6 comprises a pair of antenna elements 10 having a gap therebetween, and a switch element 12 comprising a pair of nanowires of photoconductive semiconductor material 14 connected between the antenna elements 10 across the gap. Thus, the pair of nanowires of photoconductive semiconductor material 14 (or more generally pieces of photoconductive semiconductor material 14) are separate elements. The pairs of antenna elements 10 of the respective detector elements 6 are configured so that, when the switch element 12 is conductive, current is generated between the antenna elements 10 by a polarisation component of incident terahertz electromagnetic radiation having a polarisation direction in respective sensing directions that are transverse. The polarisation component is a linearly polarised component of the incident terahertz EM radiation along the sensing direction. The antenna elements 10 of the pair of detector elements 6 may be disposed around the axis without overlap along the direction of incidence. Such an arrangement has the benefit of reducing cross-talk between the detector elements 6.

Figure 3:
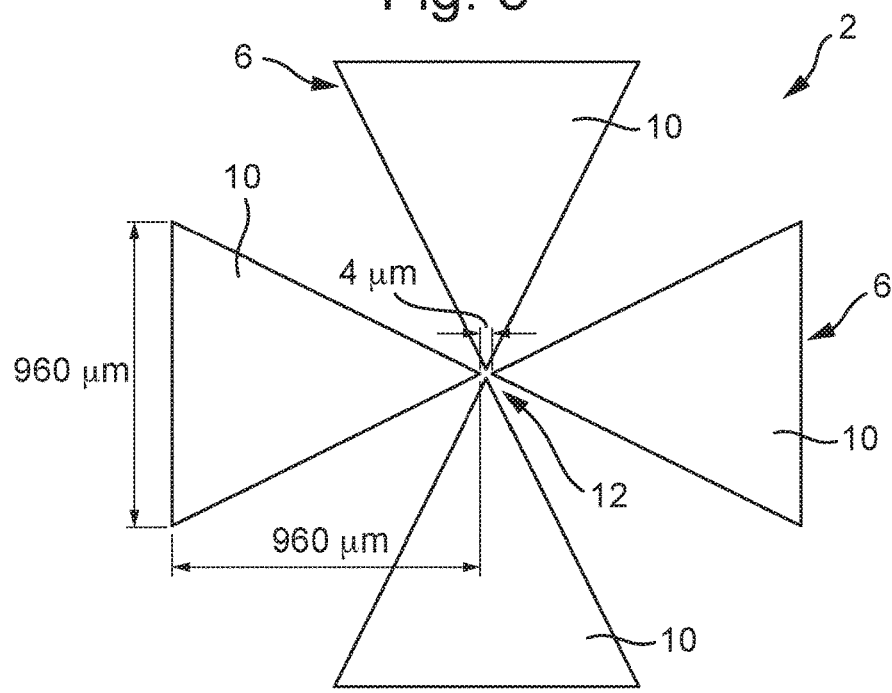
FIG. 3 is a schematic of the detector of FIG. 2, showing the dimensions of the detector.

FIG. 2 shows a scanning electron microscope (SEM) image of a detector 2 illustrating the size of the antenna elements 10. The dimensions of the detector 2 of FIG. 2 are shown schematically in FIG. 3.

Figure 4:
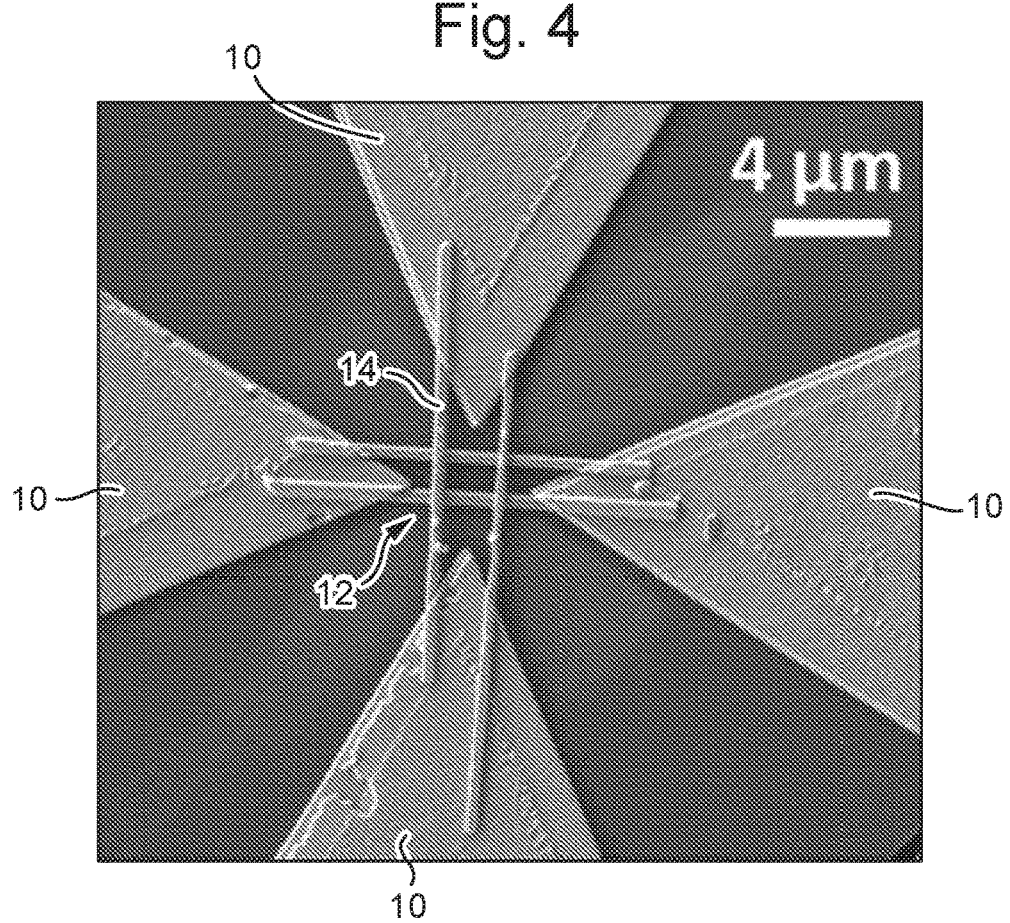
FIG. 4 is a further scanning electron microscope image of the centre of the detector of FIG. 2 at a greater magnification than FIG. 2.
Figure 5:
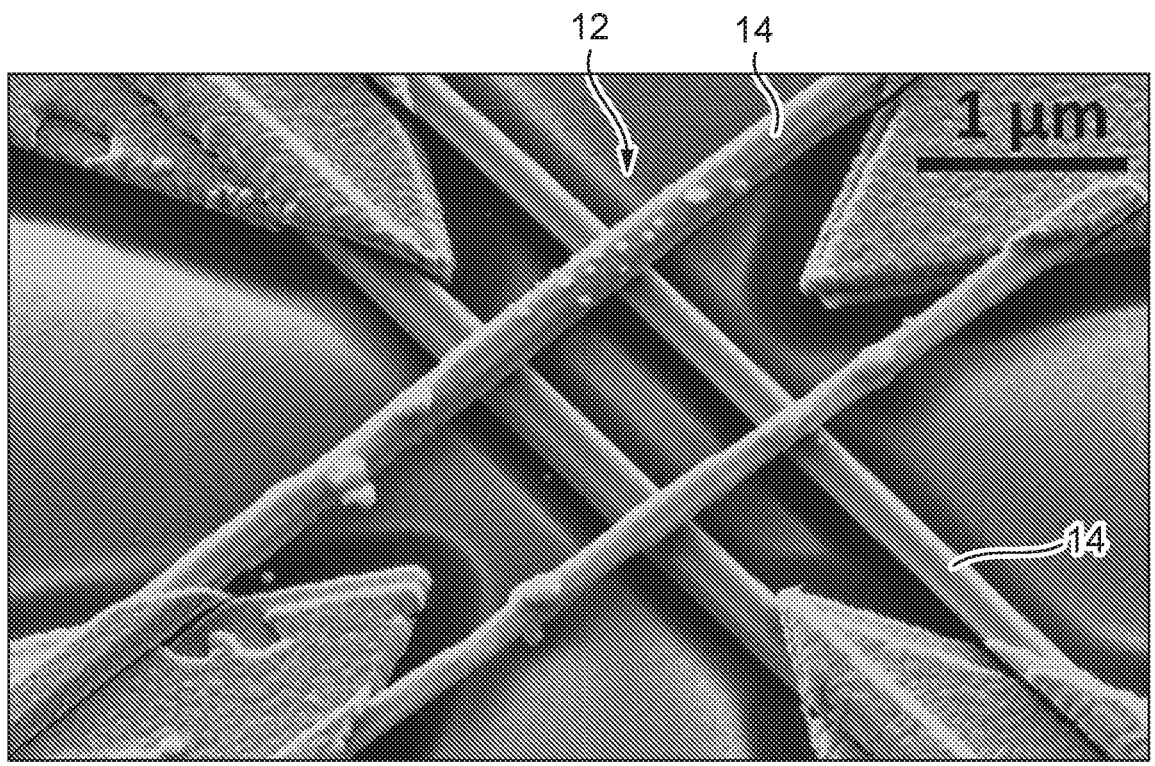
FIG. 5 is a further, tilted scanning electron microscope image of the centre of the detector of FIG. 2 at a greater magnification than FIG. 4.

FIGS. 4 and 5 show SEM images of the switch element 12 at the centre of the detector 2 of FIG. 2. FIG. 5 shows a close-up of the switch elements 12 under a tilted view of 25°. Nanowires of photoconductive semiconductor material 14 provide the one or more pieces of photoconductive semiconductor material in this example.

Figure 6:
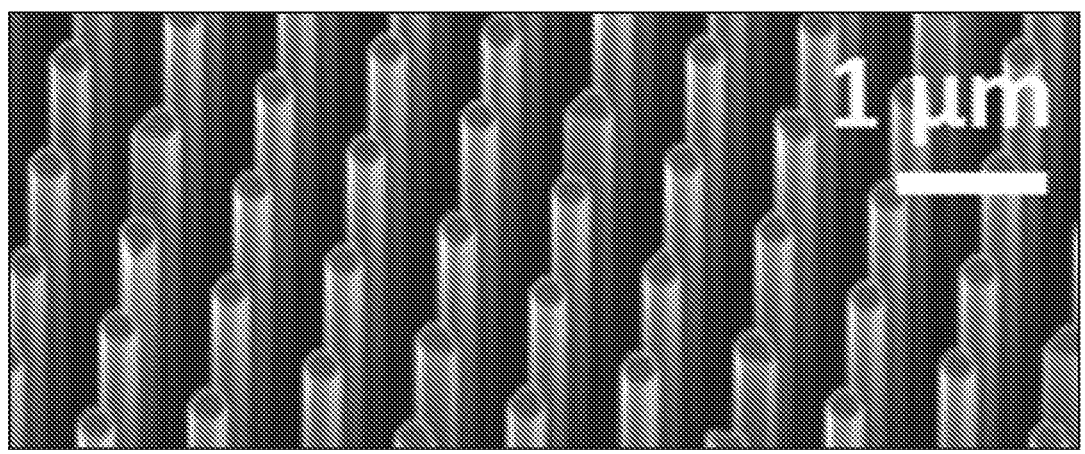
FIG. 6 is a scanning electron microscope image of nanowires on a substrate as grown.

FIG. 6 shows a number of nanowires of photoconductive semiconductor material 14 as grown. Using nanowires permits the detector 2 to be manufactured using similar techniques to those applied to known terahertz EM radiation detectors including a single detector element 6 that includes a switch element 12 comprising one or more nanowires of photoconductive semiconductor material 14.

Although a nanowire is used in several examples, the nanowires may be replaced by pieces of photoconductive semiconductor material in any suitable configuration. Thus, more generally in embodiments, the switch element 12 may be arranged as follows.

Typically, the switch elements 12 may comprise one or more pieces of photoconductive semiconductor material that is are nanostructures, that is a with one or more dimension measuring in the nanometre scale range, that is less than 1000 nm, typically being 500 nm or less. Typically, the pieces of photoconductive semiconductor material may be arranged to have a thickness in a direction along the axis in a nanometre scale range, for example less than 1000 nm, typically being 500 nm or less, preferably 250 nm or less. This thickness may be applied to any example, including nanowires and strips as discussed below.

In some examples, for example as in FIGS. 4 and 5, the pieces of photoconductive semiconductor material may be nanowires. Such nanowires may have a wire-like nanostructure. Such nanowires may have a hexagonal cross-section. Such nanowires may typically have a diameter (defined herein as twice the apothem) of a few hundreds of nanometres or less. Such nanowires may typically have a ratio of length in a direction perpendicular to the axis to thickness in a direction along the axis that is at least ten.

In other examples, the pieces of photoconductive semiconductor material may be strips of photoconductive semiconductor material, referred to below as nanostrips. Such strips may have a rectangular cross-section. Such strips may have a ratio of width in a direction perpendicular to the axis to thickness in a direction along the axis that is at least two, preferably at least ten. Such strips may have a ratio of length in a direction perpendicular to the axis to thickness in a direction along the axis that is at least ten. The strips may have a greater length than width.

Both nanowires and nanostrips can be manufactured by catalyst-free selective-area metal-organic epitaxy (SA-MOVPE), which is a bottom-up process. FIGS. 7 and 8 illustrate the steps of such a manufacturing process. As shown in FIG. 7, first a growth substrate 50 is provided. Then, a mask 51 (for example of $SiO_2$) is formed on the growth substrate 50 with apertures 52. Finally, the nanostructures 54 are epitaxial grown on the areas of the growth substrate left exposed by the apertures 52. In this manner, the apertures 52 selectively define the shape of the nanostructures 54 that are grown, as illustrated by the two alternative processes shown in FIG. 8.

In the first alternative process shown in the upper part of FIG. 8, the apertures 52a in the mask 51 are circular. As a result, nanowires 54a are grown, which typically have a hexagonal cross-section along the growth axis. Further details of this method are disclosed in Reference 23.

The nanowires 54a may be removed and used as pieces of photoconductive semiconductor material in a switch element 12. The nanowires 54a are elongate along the growth axis and so oriented in the in a switch element 12 so that the growth axis becomes the length perpendicular to the axis, as shown by the labels on the right hand side of FIG. 8. Thus, the length of the nanowires 54a in the switch element 12 is limited by the degree of epitaxial growth that may be achieved. Such epitaxial growth has a maximum value for given growth conditions due to the limited adatom diffusion length of reactant species along the bottom-up growth direction, which is commonly in the range of a few to tens micrometres.

In the second alternative process shown in the lower part of FIG. 8, the apertures 52b in the mask 51 are rectangular. As a result, nanostrips 54b are grown, which typically have a rectangular cross-section along the growth axis and also a rectangular cross section along the length of the rectangular shape of the apertures 52b in the mask 51. Further details of this method are disclosed in Reference 24.

The nanostrips 54b may be removed and used as pieces of photoconductive semiconductor material in a switch element 12. In this case, the nanostrips 54b may be oriented in the in a switch element 12 so that the length of the rectangular shape of the apertures 52b in the mask 51 becomes the length perpendicular to the axis and the growth axis becomes the width perpendicular to the axis, as shown by the labels on the right hand side of FIG. 8. Thus, the length of the nanostrips 54b in the switch element 12 is not limited by the degree of epitaxial growth that may be achieved, but is defined by the shape of the apertures 52b in the mask 51, which could be up to hundreds of micrometres and potentially unlimited. In practical terms, this means that the nanostrips 54b may have a longer length in the switch element 12 than the nanowires 54a.

Using nanostrips instead of nanowires for THz detection leads to two benefits, either or both of which may be important in a given application.

The first benefit is that nanostrips may be manufactured to provide a longer length of detection material (for the reasons discussed above) and in turn a wider detection gap. This allows a larger volume of photoconductive semiconductor material, and thus higher signal size, as well as facilitating the transfer process when manufacturing the switch element 12.

The second benefit is that the contact area for current flow between the metal of the semiconductor material may be larger in the case of nanostrips than in the case of nanowires. This a nanostrip is generally wider than a nanowire, and in addition because the hexagonal shape creates tends to overhangs which reduce the contact achieved during deposition of layers of the antenna elements 10. The latter point is illustrated in FIGS. 9(a) and (b) which illustrate a nanowire 64a and a nanostrip 64b, respectively. In each case, the nanowire 64a and a nanostrip 64b is positioned on a first layer 61 of an antenna element 10, and a second layer 62 of the antenna element 10 is deposited on top.

The detector elements 6 function effectively when the pieces of photoconductive semiconductor material are either of a nanowire or a nanostrip, but in general terms they provide different properties as follows. Roughly speaking, the THz signal size of a single nanostrip is greater than that from a single nanowire and may be approximately equal to the THz signal size of a pair of nanowires. The THz bandwidth may be approximately the same for both nanowire and nanostrips. However, the extinction ratio of a nanowire is generally much greater than the extinction ratio of nanostrip. By way of comparison, the extinction ratio is generally greater than the extinction ratio of a bulk reference photoconductive antenna, which is itself generally greater than the extinction ratio of a GaP crystal.

Equally, the pieces of photoconductive semiconductor material may have configurations other than a nanowire or a nanostrip.

The pieces of semiconductor material may be any semiconductor material that is suitable for photoconductive THz detection. Non-limitative examples of semiconductor materials that may be used include bulk Si, bulk GaAs, bulk InGaAs, alternating nanoscale multilayers of InGaAs/InAlAs and other group III-V bulk semiconductors, for example InP, InAs, InSb, GaAsSb and GaBiAs.

For optimum THz detection, the semiconductor material may be provided with a high dark resistivity, ultrashort charge carrier lifetime and reasonable carrier mobility, to ensure a sufficient response level while minimising current noise. To achieve these properties in bulk semiconductors, low-temperature molecular beam epitaxy and/or post-growth processing steps (such as ion-implantation and rapid thermal annealing) may be applied.

Similar to their bulk counterparts, where the pieces of semiconductor material are nanostructures, such as nanowires or nanostrips, the semiconductor material may be chosen accordingly. In this case the semiconductor material may be a III-V semiconductor, which may offer many desirable properties, for example a direct and tunable band gap, good carrier mobility close to that of bulk material and naturally short carrier lifetime (without requiring additional processing steps after crystal growth).

By way of example, FIG. 10 shows characteristics of the THz signal (in a graph of photocurrent over time) and the bandwidth (in a graph of normalised amplitude over frequency) of detector elements 6 in which the switch element 12 are a piece of semiconductor material comprising suitable alternatives of a GaAs nanowire (see also Reference 16), an InP nanowire (see also Reference 15), a doped InP nanowire (see also Reference 14), or a bulk InP.

The switch elements 12 of the pair of detector elements 6 cross as viewed along an axis parallel to the direction of incidence and are electrically isolated from each other. It is advantageous for the switch elements 12 to cross in this way so that the different polarisation components of incident terahertz electromagnetic radiation are measured at the same spatial location, but it is in general not necessary for the detector 2 to function.

The switch element 12 of each detector element 6 may comprise an array of pieces of photoconductive semiconductor material, for example an array of nanowires of photoconductive semiconductor material 14. Designs where each switch element 12 comprises a pair of nanowires may be referred to as a "hashtag" configuration. However, the detector 2 is not required to comprise pairs of nanowires in each switch element 12, and the number of nanowires used in each switch element 12 can vary. FIG. 11 shows three other detectors with differing numbers of nanowires of photoconductive semiconductor material 14 in each switch element 12. As seen from FIG. 11, each switch element 12 may comprise only a single nanowire. The switch elements 12 may also comprise more than two nanowires, or a strip of photoconductive semiconductor material. The switch elements 12 of different detector elements 6 may also comprise different numbers of nanowires, as seen in Device B of FIG. 11. The switch elements 12 of different detector elements 6 may also comprise a combination of nanowires and strips of photoconductive semiconductor material.

The pair of antenna elements 10 of each detector element 6 has a bow-tie arrangement, although in general other shapes of antenna element 10 are possible. In FIGS. 1 and 2, the detector 2 comprises two orthogonal bow-tie gold electrodes forming the antenna elements 10 of the respective detector elements 6, which are separately bridged by aligned nanowires forming the respective switch elements 12. Using a bow-tie electrode is known for a single detector element 6. However, when applied to the present detector 2 in a case where the switch elements 12 cross along an axis parallel to the direction of incidence, a bow-tie arrangement for the antenna elements 10 has the benefit of permitting the antenna elements 10 to be conveniently arranged around the axis.

As illustrated in FIGS. 1, 4, and 5, the nanowires forming the switch elements 12 of each detector elements are parallel to the orientation of the gap between the antenna elements 10 of each respective detector element 6, and thus the nanowires contacted by different antenna elements 10 (formed by the bow-tie electrodes) are orthogonal. As shown in FIG. 1, the orthogonal nanowires are spatially separated from the substrate 4. The orthogonal nanowires are spatially separated in the vertical direction (described as on-substrate and suspended) to ensure they are electrically isolated. This architecture is advantageous because both single nanowires (Reference 18) and bow-tie photoconductive terahertz detectors based on single nanowires (Reference 15) exhibit extremely high polarisation selectivity to terahertz radiation. The response to terahertz radiation is strongest if the terahertz radiation is polarized parallel to the nanowire axis, and close to zero if the terahertz radiation is polarized perpendicular to the nanowire axis. Therefore, the present detectors 2 based on two transverse detector elements 6, (in this case comprising orthogonal single semiconductor nanowires or orthogonal arrays of parallel semiconductor nanowires) are able to provide full polarisation characterization.

In use, the detector 2 may further comprise a detection circuit 16 connected to the antenna elements 10 of each detector element 6 for detecting the generated current. The current induced between the two antenna elements 10 of a typical detector element 6 can be expressed as $$I(\tau) \propto \int_{-\infty}^{+\infty} E_{(THz)}(t)\sigma(t-\tau)dt \qquad \text{Equation 1}$$

where $E_{(THz)}(t)$ is the effective electric field of the terahertz transient at the detector element 6, and $\sigma(\tau)$ is the photoconductivity of the photoconductive semiconductor material of the switch element 12 as a function of time. When the photoconductive semiconductor material of the switch element 12 has a much longer charge-carrier lifetime (>100 ps) than the duration of the terahertz transient, the conductivity can be approximated as a unit step function and the detector 2 is categorized as an "integrating detector", where $$I(\tau) \propto \int_{\tau}^{\infty} E_{(THz)}(t)dt \qquad \text{Equation 2}$$

From Eq. 2, the terahertz electric field $E_{(THz)}(t)$ can be recovered from the $I(\tau)$ data by differentiation with respect to $\tau$. More details can be found in Reference 20.

The detector 2 may be incorporated in a terahertz electromagnetic radiation detection apparatus such as the terahertz-TDS apparatus 20 shown schematically in FIG. 12. The terahertz-TDS apparatus 20 of FIG. 12 is arranged to perform time domain spectroscopy (TDS), but in general the terahertz electromagnetic radiation detection apparatus does not have to be arranged to perform TDS, and could be arranged to perform other types of measurement, for example continuous transmission measurements. The terahertz-TDS apparatus 20 comprises the detector 2, and further comprises a terahertz electromagnetic radiation system 22 arranged to direct terahertz electromagnetic radiation onto the detector 2 along the direction of incidence. The terahertz-TDS apparatus 20 further comprises a control system 24 arranged to direct light onto the detector 2 for controlling the conductivity of the switch element 12. The terahertz electromagnetic radiation system 22 and the control system 24 may be arranged in a similar manner to those of known terahertz detection apparatuses.

The control system 24 comprises a controller 26, and a femtosecond laser 28. While a femtosecond laser 28 is used in the control system 24 of FIG. 12, other light sources could be used instead of the femtosecond laser 28. For example, depending on the application, a pulsed laser with longer pulse times could be used. The controller 26 controls the emission of light by the femtosecond laser 28 in order to control the conductivity of the switch element 12. In the terahertz-TDS apparatus 20 of FIG. 12, the femtosecond laser 28 of the control system 24 is also used to excite the terahertz emitter 23 of the terahertz electromagnetic radiation system 22. However, this is not in general necessary, and the terahertz electromagnetic radiation system 22 may comprise a separate light source, or may generate terahertz electromagnetic radiation via a different mechanism that does not require optical excitation.

FIGS. 14 to 16 show the results of measurements conducted on the detector 2, in which the photoconductive semiconductor material comprises one or more nanowires of semiconductor material 14. The measurements characterize the polarisation-sensitive nanowire detector 2 in terahertz-TDS.

FIG. 14 shows the spectral response of the nanowire detector 2 as a function of the incident terahertz polarisation angle. The four rows show, from top to bottom, measurements at incident terahertz pulse polarisations of 0°, 30°, 60° and 90°. The red solid line (lighter-coloured line in greyscale) shows the response from the horizontal detection channel (i.e. the current measured from the horizontally-aligned detector element 6). The blue solid line (darker-coloured line in greyscale) shows the response from the vertical detection channel (i.e. the current measured from the vertically-aligned detector element 6). The two leftmost columns show measurements of the raw and processed time-domain terahertz electric field. It can be seen clearly that the horizontal and vertical channels produced responses simultaneously with a current level of a few picoamps, spectral bandwidth of ~2 THz (defined as the cut off frequency at the noise floor of the frequency spectrum) and low-noise performance. The third column shows the amplitude and phase spectrum of the terahertz electric field. The fourth, rightmost column shows the terahertz electric field distribution at 1 THz.

FIG. 15 shows the relationship between the two orthogonal detection channels in the detector 2 as function of the incident terahertz polarisation angle. The red, solid-coloured dots show the peak-to-peak response from the horizontal detection channel. The blue, open dots show the peak-to-peak current from the vertical detection channel. Each detection channel represents the current generated by one of the two transverse detector elements 6, and in the example of FIGS. 14 to 16, the two transverse detector elements 6 are orthogonal. The current generated by the detector 2 is limited by the volume of the photoconductive semiconductor material of the switch elements 12, but can be increased by adding additional nanowires to the switch element 12, by using larger diameter nanowires, or by using a strip of photoconductive semiconductor material in place of nanowires.

The two orthogonal channels provided by the two detector elements 6 have a strong linear response relative to the terahertz polarisation. The measured response current reaches a maximum when the detector element 6 orientation is parallel to the terahertz polarisation and in contrast drops to nearly zero when the detector element 6 is perpendicular to the terahertz polarisation. Finite-difference time-domain simulations (FDTD) were performed to examine the antenna element 10 response to the terahertz polarisation, which is also linear for each bow-tie structure. The bow-tie antenna element 10 structure both enhances the intrinsic terahertz polarisation sensitivity of the semiconductor material of the switch element 12, and collects the incident terahertz electric field over a much larger area to concentrate it at the gap between the antenna elements 10. FIG. 15 illustrates the angle-dependent response (peak-to-peak current) of the orthogonal detector elements 6 relative to terahertz polarisation, in excellent agreement with cosine- and sine-response shapes respectively. This indicates the two orthogonal detector elements 6 are independent without any measurable crosstalk between them.

The cross circles of FIG. 15 show the relative changes in the terahertz polarisation angle measured with the detector 2 for rotations of the terahertz electromagnetic radiation emitter 23. The rotation resolution shown is 0.1° steps from 45° to 46°, and larger steps of up to 5° at other values of polarisation. The polarisation selectivity of each detection channel of the nanowire detector 2 (having the 'hashtag' configuration) was assessed by measuring the cross-polarized terahertz field extinction ratio. This ratio was found to be approximately 50 for the horizontal channel, and 38 for the vertical channel. The remarkably high extinction ratio is due to the aligned nanowires of the detector 2 being intrinsically polarisation-sensitive while there is no crosstalk.

The polarisation selectivity of the nanowire detector 2 was compared with two conventional terahertz detectors that measure one linear polarisation: electro-optic sampling based on a 0.2 mm-thick (110) ZnTe crystal, and a single bow-tie photoconductive receiver on a bulk Fe+-implanted InP substrate. The polarisation selectivity of these conventional detectors was characterized using the same system and methodology as for the nanowire detector 2. The recorded cross-polarized terahertz field extinction ratio was measured as 24 for the ZnTe crystal detector, and 30 for the bulk bow-tie detector (characterization results of the reference detectors can be found in the SI). This value is significant improvement on the ratio of 10 (100 in power) reported in Reference 8 and 16 reported in in Reference 12. The horizontal detection channel performed slightly better than the vertical channel (10% difference) in the nanowire detector 2. The difference in performance could be attributed to variation in the nanowire properties causing device-to-device variation for the two channels. This can be easily solved by introducing a calibration (using a standard terahertz source) and normalization procedure for the time-domain data. After the calibration and normalization, the sensitivity of the nanowire detector 2 to the change of the terahertz polarisation angle was assessed as shown in FIG. 16. The standard deviation of the measured angle values (calculated from the two-channel data) is 0.38°, indicating the minimum detectable change of polarisation angle is less than 0.4° for the nanowire detector 2.

The nanowires of photoconductive semiconductor material 14 in the switch element 12 of the detectors 2 shown in the figures are single-crystal semiconductor nanowires. These have been systemically studied in previous studies (References 14-16) confirming their suitability for photoconductive terahertz detection, due to properties such as low-noise, long time sampling window, broad detection bandwidth and wide choice of materials. The nanowires in FIGS. 4 to 6 are indium phosphate (InP) nanowires with a pure wurtzite crystal structure (Reference 17) and an approximate average diameter and length of 280 nm and 10 µm. However, in general other nanowires could be used, for example having differing dimension or using other semiconductor materials.

The InP nanowires were grown via catalyst-free selective-area metal-organic epitaxy (SA-MOVPE). A 30-nm $SiO_2$ mask layer was firstly deposited on (111)A InP substrates, then patterned by electron beam lithography (EBL) to create arrays of circles. The circle was then transferred to the $SiO_2$ mask by wet chemical etch using buffered hydrogen fluoride (BHF) solution. After etching, the diameter of the circles was 200 nm with a pitch of 800 nm. The patterned substrates were then loaded into a horizontal-flow low-pressure (100 mbar) MOVPE system (Aixtron 200/4). All samples were annealed at 750° C. for 10 min under a phosphine protective flow and grown at 730° C. for 40 min with trimethylindium and phosphine at a flow rate of $6.1 \times 10^{-6}$ and $4.9 \times 10^{-4}$ mol/min, respectively. Similar growth conditions have been previously reported (Reference 17) and shown to produce pure wurtzite structurally uniform and high quantum efficiency InP nanowires with a range of diameters from 250 to 300 nm and lengths from 8 to 11 µm.

The conductivity properties of InP nanowires grown in this manner were characterized by time-resolved optical-pump terahertz-probe (OPTP) spectroscopy, using the technique of Reference 15. The photoconductivity lifetime of the active material in the terahertz photoconductive detector determines the detector operation type and thus the signal processing technique. The photoconductivity rise time was sub-picosecond, and the photoconductivity lifetime was ~970 ps for the ensemble of the InP nanowires used for the detector shown herein, indicating the InP nanowire detectors are of integrating type (Reference 20). The carrier mobility of the InP nanowires was extracted to be $606 \pm 210$ $cm^2$ $V^{-1}$ $s^{-1}$, so a reasonable signal size can be produced in detectors comprising such nanowires.

A nanoscale transfer printing technique as disclosed in Reference 19 was utilized to position the nanowires in the detector 2, enabling rapid and accurate transfer and printing of nanowires onto the targeted location with well-defined orientation. The fabrication process involves two steps of EBL and two nanowire transfers, which enables the transverse detector elements 6 (in these embodiments comprising orthogonal nanowires) to be spatially separate, thereby avoiding crosstalk between the two polarisation channels.

The detector 2 has a 3D device geometry as shown in FIG. 1, and is a polarisation-resolved nanowire terahertz detector with two detector elements 6 that cross as viewed along an axis parallel to the direction of incidence and are electrically isolated from each other. In order to make the two orthogonal detector elements 6 electrically isolated from one another, the fabrication process involves two EBL steps, two nanowire transfer steps, and two metal deposition steps. This process is illustrated in FIG. 17.

Firstly, the substrate 4, in this case comprising z-cut quartz with gold markers, is prepared using EBL. Then the InP nanowires are mechanically broken off from the as-grown substrate and positioned at a predefined location on the quartz substrate 4 with designated nanowire orientation and numbers, shown by step (1) in FIG. 17. This step is performed using the nanoscale transfer printing technique disclosed in Reference 19.

Subsequently the z-cut quartz substrate 4 with transferred nanowires is patterned by EBL for making the antenna elements 10. An oxygen plasma etch is employed to remove photoresist residue on the nanowires, followed by a 9.3% HCl chemical etching to remove the native oxide layer formed on the nanowire surface. Finally, the detector elements 6 are metallized using thermal evaporation and lift-off, with Cr/Au (10 nm/330 nm) contacts. At this point in the fabrication process, the gap between the pair of antenna elements 10 of one of the two detector elements 6 has been bridged by the nanowires, as shown in step (2) of FIG. 17.

Next, further InP nanowires are positioned on the top surface of the antenna elements 10 of the other of the two detector elements 6, aligned in a direction orthogonal to the nanowires of the one of the two detector elements 6, as seen in step (3) of FIG. 17. This step is performed using the nanoscale transfer printing technique disclosed in Reference 19.

Finally, both detector elements 6 are again patterned by EBL, etched and metalized, following all the steps and recipes as used previously. The result is a pair of orthogonal, nanowire-bridged detector elements 6 in the detector 2. The numbers of nanowires for each channel can be manipulated, as shown in FIG. 11. The average nanowire diameter is around 280 nm, which is less than the deposited thickness of 340 nm of the antenna elements 10. Therefore, the height of the transferred nanowires above the substrate 4 differs for the initially and subsequently transferred nanowires. The initially-transferred nanowires are laid on the substrate 4, and the subsequently-transferred nanowires are suspended above the substrate 4, forming an air gap of a few tens of nanometres between the switch elements 12 of the two detector elements 6. Therefore, the one or more pieces of photoconductive semiconductor material (in this example, nanowires of photoconductive semiconductor material 14) in each of the two detector elements 6 are separated in vertical direction, and thus electrically isolated from one another. Although in this detector 2, the nanowires of the two detector elements 6 are separated (and thereby electrically isolated) with an air gap, other methods could be used to insulate the detector elements. For example, a layer of insulating material could be deposited between the nanowires of different detector elements 6.

To perform the measurements shown in FIGS. 14 to 16, and those discussed further below, the polarisation-sensitive nanowire detector 2 was incorporated following fabrication into the terahertz-TDS apparatus 20 of FIG. 12 discussed above. The femtosecond laser 28 is a Ti:sapphire laser, which produces pulses at a centre wavelength of 800 nm with a duration of ~35 fs and a repetition rate of 84.5 MHz. The pulsed laser beam was split using a beam splitter 30 into two beams to travel along two paths. The beam travelling along the first path 32 (with a power of ~180 mW) was used to excite the GaAs terahertz emitter 23 of the terahertz electromagnetic radiation system 22 for pulsed terahertz generation. The beam travelling along the second path 34 was used to switch the nanowires of photoconductive semiconductor material 14 of the switch elements 12 of the detector 2 for photocarrier generation. The beam travelling along the second path 34 functions as a 'gate pulse', directly exciting the switch elements 12 of the detector 2 with a fluence of 3.1 nJ/cm$^2$/pulse. A delay stage was utilized to change the time delay between the terahertz pulse and the gate pulse. The real-time electric field of the incident terahertz pulse can be retrieved by measuring the real-time terahertz-induced current in the detector 2 (Reference 20).

FIG. 13 is a schematic illustration of the nanowire detector 2 in operation. In detector operation, no external DC bias is required. Instead, the emitted terahertz pulse is focused on the detector 2 with aligned polarisation across the antenna elements 10, inducing a transient bias voltage across the antenna elements 10, and consequently a transient photocurrent in the detector 2 that can be measured to recover the incident terahertz electric-field pulse.

The terahertz emitter 23 of the terahertz electromagnetic radiation system 22 is a rotatable interdigitated photoconductive emitter, Tera-SED3, Laser Quantum UK, 3 mm×3 mm. This is a commercial, interdigitated photoconductive emitter and was mounted in a motorized rotation stage for generation of single-cycle linearly-polarized terahertz pulses. The terahertz emitter 23 was biased with a square wave of ±14V amplitude at 10 kHz. By rotating the terahertz emitter 23, the polarisation of the terahertz pulses could be rotated to any arbitrary angles with a precision<0.1°, from 0° to 360°, perpendicular to the propagation direction. In the terahertz-TDS apparatus 20, the emitter angle is equal to the angle that the emitted terahertz pulse is polarized at, where 0° corresponds to the terahertz pulse polarized horizontally (with respect to the optical table) and 90° corresponds to the terahertz pulse polarized vertically. The detector 2 with two orthogonal detector elements 6 is also aligned in the terahertz-TDS apparatus 20, with one detector element 6 orientated horizontally (with respective to the optical table) and the other vertically. A similar system based on the same terahertz emitter type has been reported in (4), verifying its validity. For measurement accuracy, the optical pulse onto the terahertz emitter 23 from the beam travelling along the first path 32, the terahertz emitter 23 centre, and the rotation axis are required to be aligned, to ensure a minimal variation in the amplitude of the generated terahertz electric field with terahertz emitter rotation angle. The detection circuit 16 comprises two SR555 current preamplifiers and two model SR830 lock-in amplifiers, one lock-in amplifier and one preamplifier provided on each of the two detection channels. For the lock-in amplifier, the time constant was set at 1 s with a choice of 24 dB/oct roll-off. For data acquisition, the acquisition bandwidth was set at 20 THz for all samples, and parameters such as scan speed and scan numbers are the same as well. To make sure the results from different types of detectors can be used for comparison, measurement setups and corresponding setting parameters were the same for measuring both the nanowire detector 2 and bulk photoconductive detectors.

The chopping frequency of the terahertz emitter 23 is a parameter that can have significant influence on the response of the nanowire detector 2. In the present application, for the purpose of evaluating signal to noise ratio, 'signal' is used to mean the peak-to-peak current on one time-domain scan, and 'noise' is the standard deviation of the difference of two consecutive scans. The signal-to-noise ratio of the nanowire detector 2 was measured as function of the terahertz emitter 23 chopping frequency, and the results are shown in FIG. 18. The measured signal-to-noise ratio drops for low frequencies (<10 Hz). This drop could result from several factors, including 1/f noise and the poor response of the lock-in amplifier at very low frequencies. A gradient drop in the high frequency range (>10 kHz) is also observed, which coincides with the increasing gradient of the input impedance of the pre-current amplifier (SR555), and therefore does not necessarily imply a real reduction of the signal to noise performance of the detector 2. The chopping frequency was set at 10 kHz for measurements with the nanowire detector 2 to ensure the best signal-to-noise ratio performance for the experiments above.

As mentioned above, the horizontal detection channel performed slightly better than the vertical channel (10% difference) in the measurements of FIG. 15. The nanowires are optically anisotropic to photoexcitation. Since the optical gate pulse incident on the nanowire detector 2 was linearly polarized in the measurements of FIG. 15, it should be taken into account that the anisotropic absorption of light relative to the nanowire orientation may cause a performance difference between the two orthogonal detector channels. To assess this, a quarter-wave plate was inserted into the second path 34 to change the polarisation of the optical gate pulse on the detector 2 from linear to circular. FIG. 19 shows the response of the nanowire detector 2 when excited by linearly polarized optical gate pulses and circularly polarized optical gate pulses. The horizontal channel performed a little better (10% difference) than the vertical channel in both cases, which means the absorption anisotropy to optical gate pulses is not the main reason causing the channel performance difference.

For comparison, a multi-contact photoconductive antenna was fabricated with the same bow-tie electrode structure of the antenna elements 10 as the nanowire detector 2, but with a more conventional Fe+-implanted InP substrate. The Fe+-implanted InP substrate acts as both the active material and device substrate, i.e. replacing the nanowires of the present detector 2. This bulk reference device was measured under identical conditions to the nanowire detector 2. As expected, strong crosstalk dominates the signal and furthermore the degree of cross-talk is dependent on the size and position of the optical excitation spot, thereby making extraction of the terahertz polarisation state non trivial and alignment dependent.

The gap of each bow-tie electrode is 4 µm in the detector, which is much smaller than the beam spot size (50 µm) of the optical gate pulse incident on the detector centre. Therefore, the region between the antenna elements 10 of neighbouring detector elements 6 (of the two-orthogonal bow-tie electrode structures) will also be photoexcited, causing current flows between detector elements 6, and thus crosstalk between the two orthogonal channels. FIG. 20 shows the peak-to-peak response of the bulk ion-implanted InP reference detector as a function of the incident THz polarisation angle, and clearly shows the crosstalk influence on the performance of the bulk reference detector. The measurements include a first case (dot data) where the two orthogonal channels are measured simultaneously and a second case (cross dot data) where the two orthogonal channels are measured separately. A difference in response current level is clearly observed between the two cases of measuring the two orthogonal channels simultaneously and separately. Most interestingly, the angle-dependence response shapes of the two orthogonal channels seem are rotated by 45° compared to the nanowire detectors (see FIG. 15) and can no longer be differentiated due to the strong crosstalk.

FIGS. 21 to 25 demonstrate an application of the polarisation-sensitive nanowire terahertz detector 2 to the analysis of a metamaterial. Characterization of the terahertz metamaterial demonstrates the versatility of the polarisation-resolved terahertz-TDS system 20 comprising the nanowire detector 2. Metamaterials for terahertz band have attracted world-wide attention because of their simplicity and utility for design of terahertz devices. Metamaterials are important for designing devices capable of manipulating the polarisation state of terahertz radiation, as it is difficult to achieve this effect in natural materials. The terahertz metamaterial characterized herein comprises twisted split-ring resonator pairs (see Reference 21) and functions as a polarisation converter.

FIG. 21 is a schematic representation of transmission measurements being made of a terahertz metamaterial. The arrowed solid lines show the polarisation of the terahertz pulse before and after passing through the metamaterial. As can be seen from the figure, the metamaterial has the effect of altering the polarisation of the terahertz pulse.

FIG. 22 shows a series of SEM images at increasing magnification of the morphology of the metamaterial shown schematically in FIG. 21. The close-up views illustrate the unit cell details of the metamaterial. The metamaterial is composed of periodic arrays of twisted split-ring resonator (SRR) pairs, using a cell array with periods of $X_{array}$=72 µm and $Y_{array}$=36 µm in the x and y directions. The metamaterial is patterned on a z-cut quartz substrate (10 mm×10 mm×0.5 mm) by EBL, followed by metal deposition of 10/300 nm Cr/Au (via thermal evaporation) and a lift-off process. The twisted SRR pair consists of two identical planar SRRs rotated by 90° with respect to each other, forming a periodic array of pairs of edge-coupled orthogonal split-ring resonators (with gap orientation in the horizontal and vertical directions). The dimensions of the of the SRR pairs in the unit cell of the metamaterial are shown schematically in FIG. 23. The SRR pair arrays occupy an area of 8 mm×8 mm, much larger than the diameter of the incident terahertz beam (approximately 1 mm) on the metamaterial. This metamaterial is designed to induce a resonance splitting in the transmitted terahertz spectrum, accompanied by polarisation conversion to the orthogonal direction. When a linearly-polarized terahertz pulse transmits through the metamaterial, the coupling effect will induce co- and cross-polarisation components in the transmission direction (which can be simultaneously measured by the horizontal and vertical detection channels in the detector 2, respectively).

FIG. 24 shows simulated and measured transmission spectra of the terahertz metamaterial in co-(solid line) and cross-(dot line) polarisations. All the spectra are normalized to the co-polarisation transmission spectra. The shadows around the lines are error bars showing the standard variation of repeats in the same measurement. The terahertz emitter 23 was rotated to provide plane polarized pulses at 0° (horizontally). The terahertz pulse was measured using the detector 2 after passing through the metamaterial. The raw measurement results are shown in FIG. 25. The left-hand panel of FIG. 25 shows raw time-domain data, and the right-hand panel of FIG. 25 shows the amplitude spectrum of the measured THz electric field. The dashed lines show the data without the metamaterial inserted in the system. The coupling effect of the metamaterial to the incident terahertz pulse induced co- and cross-polarisation components of the terahertz pulse in the transmission direction.

Finite-difference time-domain (FDTD) simulations were performed to generate the simulated transmission amplitude spectra and examine the coupling effect of the metamaterial to the incident terahertz pulse in comparison with the experimental results. The simulated and measured transmission amplitude spectra show an excellent agreement. In particular, the co-polarized transmission has a feature of resonance splitting (at 1.06 and 1.4 THz) that is also observed in the measured spectra. The difference in the transmission ratio could be attributed to imperfect experimental condition as well as the dielectric properties of materials being slightly different from the values used in simulation.

A similar work has been reported (Reference 21), where four wire-grid terahertz polarizers had to be employed in the system for a reasonable accuracy. The measurement using the nanowire detector 2 reduced the time by 50% without the need of repeated recalibration, while still providing sufficient accuracy.

Another example of characterization of a birefringent material with the nanowire detector was performed to further demonstrate the convenience and high accuracy of the nanowire detector 2.

Figure 26B:
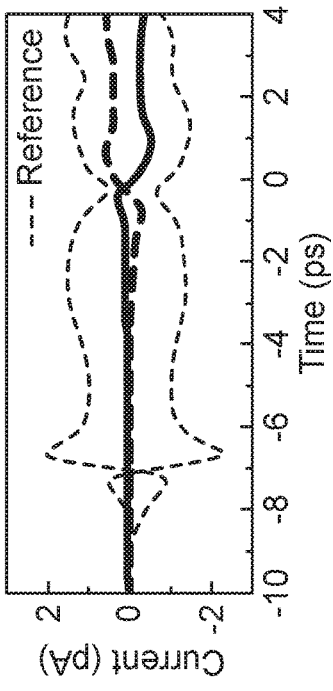
Figure 26A:
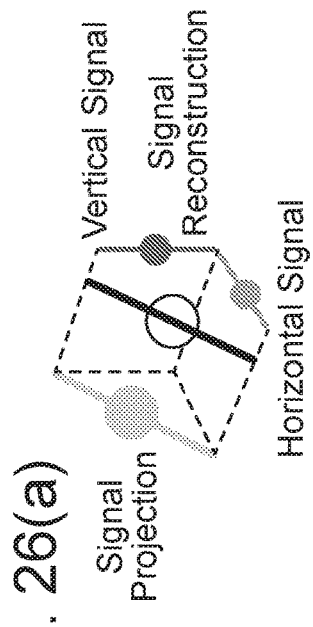
Figure 26D:
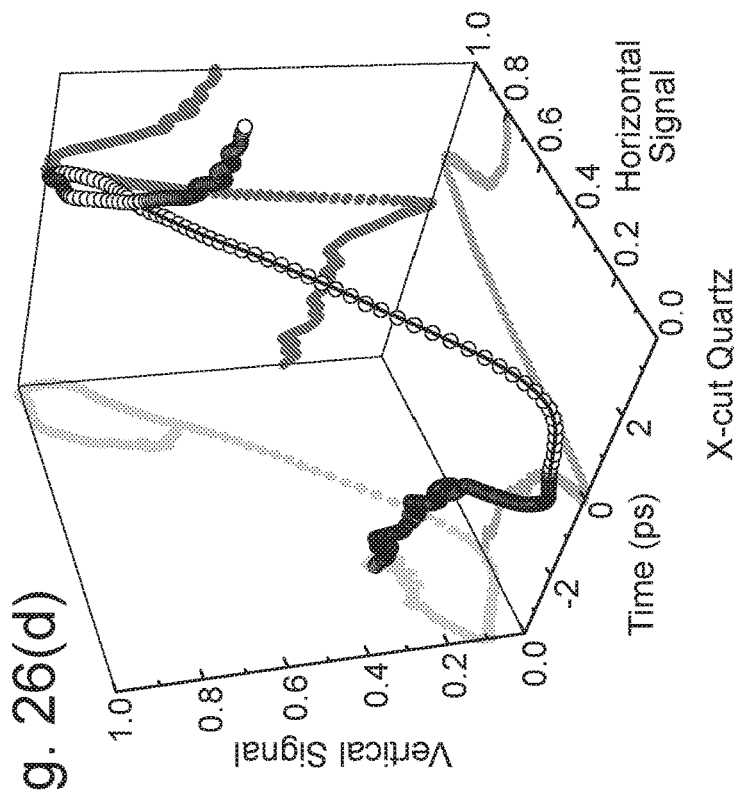
Figure 26C:
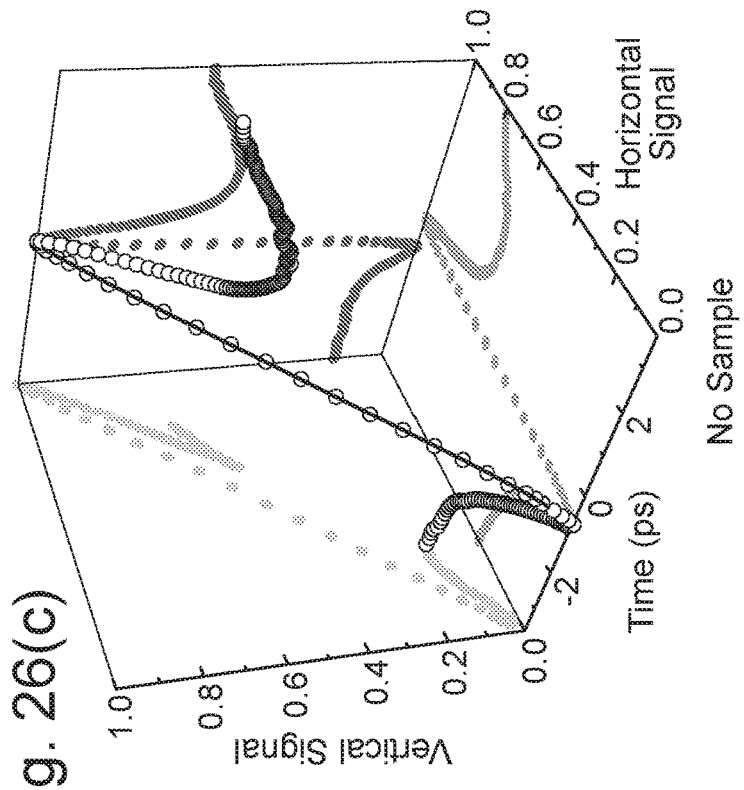

An x-cut quartz crystal was measured with the ordinary and extraordinary axes in the horizontal and vertical directions using the nanowire detector 2 in the terahertz-TDS system. The terahertz emitter 23 was rotated to provide plane polarized pulses at 45°. The terahertz pulse was measured after passing through the quartz. The pulses measured are shown in FIG. 26A. Due to birefringence of the quartz, the transmitted terahertz pulse was split into two by polarisation with a 0.34-ps time delay in between, as seen from the raw time-domain data of FIG. 26B. The dashed line of FIG. 26B is the data without the x-cut quartz inserted in the system. The projection plots in FIGS. 26C and 26D are 3D projection plots of the (normalized) time-domain data of FIG. 26B. FIGS. 26C and 26D show the polarisation of the terahertz pulse changes from linear to elliptical (right handedness) after propagating through the x-cut quartz.

Figure 27B:
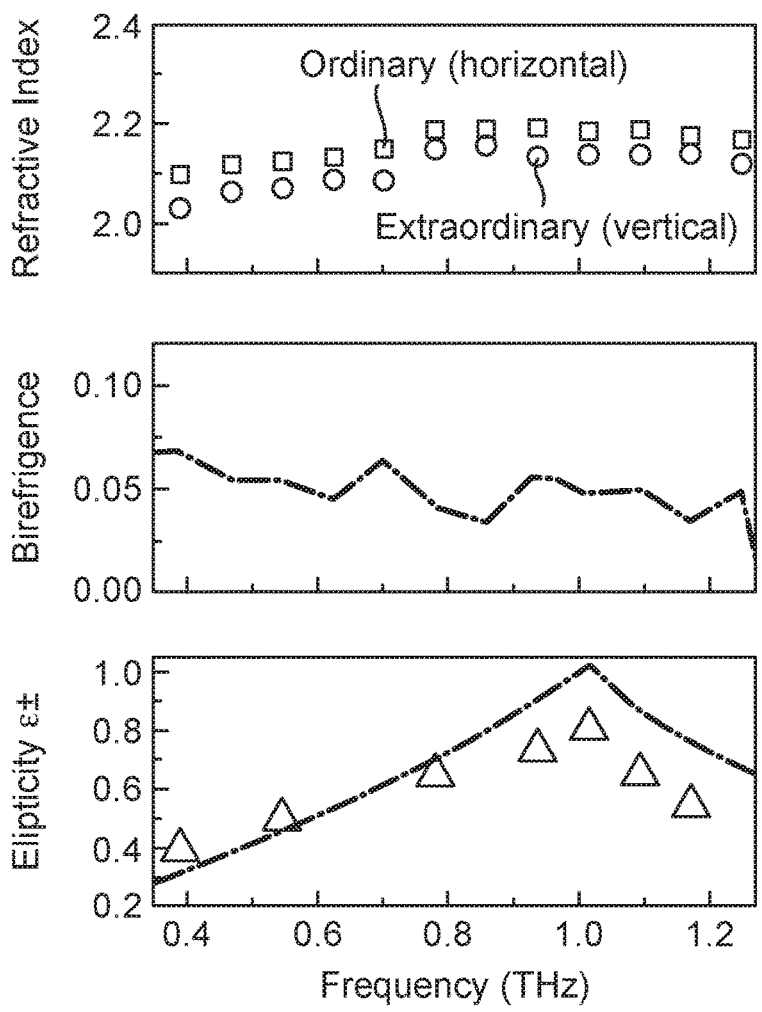

Secondly, an x-cut quartz crystal of thickness of 1.55 mm was measured. This specific thickness is chosen to function as a quarter-wave plate at 1 THz. As shown schematically in FIG. 27A, after passing through the x-cut quartz, the terahertz pulse (polarized at) 45° is split by polarisation into two along the horizontal (ordinary axes) and vertical (extraordinary axes) directions, respectively. A slight time delay is present between the two pulses due to the material birefringence, and is straightforwardly measured by the detector 2. FIG. 27B shows the values of the ordinary and extraordinary refractive indices of x-cut quartz, its birefringence obtained from the nanowire detector 2, and the ellipticity extracted from the two transmitted terahertz pulses. The measured ellipticity as a function of the frequency is presented in FIG. 27B, where the dashed line is the expected response as calculated for the quarter-wave plate. The results indicate that the electric field of the terahertz pulse become circular at 1 THz as expected. The characterization of a similar x-cut quartz crystal has been previously reported (References 7, 22), where a three-contact photoconductive antenna was utilized with consistent results. The present detector 2 benefits from the lack of crosstalk issues between the detection channels, which required a high workload to set up the optical alignment of the three-contact photoconductive antenna detector in the previous study.

In summary, the present detector 2 allows full characterization of polarisation states of terahertz radiation based on orthogonally-crossed nanowires of photoconductive semiconductor material 14. The detector 2 is compact and can immediately replace conventional photoconductive detectors in most terahertz-TDS spectrometers and imaging systems, without any change to the optical layout. This vastly improves the capabilities of such systems by including extra spectral polarisation information without increased acquisition time. This advance is particularly important for the study of anisotropic materials, highly favored in the expanding field of metamaterials. Furthermore, the device opens possibilities for new non-contact magneto-transport studies: terahertz spectral ellipsometry and vibrational circular dichroism. The detector architecture is simple and universal, so could exploit any 1D or quasi-1D semiconducting nanostructures (e.g. nanorods, nanopillars and nanostrips/nanosheets) for further optimizing device performance, in terms of signal-to-noise and accessing ultrabroad spectral bandwidth, thus paving the way to industry-level high-speed high-accuracy terahertz pulsed imaging.

The detector 2 could be scaled down for miniaturized terahertz spectroscopic and imaging application (e.g. on-chip terahertz-TDS spectrometer), which would be particularly desirable in the design of sub-wavelength detection units in near-field terahertz imaging systems for polarisation-based super-resolution imaging (i.e. nanoscale spatial resolution). The frequency range of the detector 2 could be extended in both spectral directions (towards microwaves, or mid/near IR light).

FIG. 28 shows a single detector element 6 having a similar configuration to FIG. 1 except that the photoconductive switch element 12 is a nanostrip 74 made of InP. The detector element 6 may be incorporated one of the pair of detector elements 6 in a detector 2 that is otherwise arranged as described above. Characteristics of the detector element 6 of FIG. 28 are shown in FIGS. 29 to 31. In particular, FIG. 29 is a plot of the peak-to-peak response of the detector element 6 as a function of the incident THz polarisation angle, and FIGS. 30 and 31 are graphs of the THz signal (in a graph of photocurrent over time) and the bandwidth (in a graph of normalised amplitude over frequency), respectively, of the detector element 6. Thus, the detector element 6 of FIG. 28 incorporating a nanostrip has a THz signal size similar to a detector element 6 comprising a pair of nanowires, a spectral bandwidth of ~2 THz, and a lower extinction ratio than a detector element 6 comprising a nanowire.

REFERENCES

The references cited above are identified as follows, each reference being incorporated herein by reference.

(Reference 1) B. B. Hu, M. C. Nuss, Imaging with Terahertz Waves. Opt Lett 20, 1716-& (1995).

(Reference 2) N. C. J. van der Valk, W. A. M. van der Marel, P. C. M. Planken, Terahertz polarisation imaging. Opt Lett 30, 2802-2804 (2005).

(Reference 3) S. Watanabe, Terahertz Polarisation Imaging and Its Applications. Photonics 5, (2018).

(Reference 4) C. D. W. Mosley, M. Failla, D. Prabhakaran, J. Lloyd-Hughes, Terahertz spectroscopy of anisotropic materials using beams with rotatable polarisation. Scientific Reports 7, (2017).

(Reference 5) Q. Chen, X. C. Zhang, Polarisation modulation in optoelectronic generation and detection of terahertz beams. Applied Physics Letters 74, 3435-3437 (1999).

(Reference 6) D. S. Bulgarevich et al., Polarisation-variable emitter for terahertz time-domain spectroscopy. Optics Express 24, 27160-27165 (2016).

(Reference 7) E. Castro-Camus et al., An ion-implanted InP receiver for polarisation resolved terahertz spectroscopy. Optics Express 15, 7047-7057 (2007).

(Reference 8) E. Castro-Camus et al., Polarisation-sensitive terahertz detection by multicontact photoconductive receivers. Applied Physics Letters 86, 254102-254102 (2005).

(Reference 9) D. S. Bulgarevich et al., A polarisation-sensitive 4-contact detector for terahertz time-domain spectroscopy. Optics Express 22, 10332-10340 (2014).

(Reference 10) H. Makabe, Y. Hirota, M. Tani, M. Hangyo, Polarisation state measurement of terahertz electromagnetic radiation by three-contact photoconductive antenna. Optics Express 15, 11650-11657 (2007).

(Reference 11) N. Nemoto, T. Higuchi, N. Kanda, K. Konishi, M. Kuwata-Gonokami, Highly precise and accurate terahertz polarisation measurements based on electro-optic sampling with polarisation modulation of probe pulses. Optics Express 22, 17915-17929 (2014).

(Reference 12) A. Hussain, S. R. Andrews, Ultrabroadband polarisation analysis of terahertz pulses. Optics Express 16, 7251-7257 (2008).

(Reference 13) G. Niehues et al., A matter of symmetry: terahertz polarisation detection properties of a multi-contact photoconductive antenna evaluated by a response matrix analysis. Optics Express 23, 16184-16195 (2015).

(Reference 14) K. Peng et al., Single n+-i-n+InP nanowires for highly sensitive terahertz detection. Nanotechnology 28, 125202 (2017).

(15) K. Peng et al., Broadband phase-sensitive single InP nanowire photoconductive terahertz detectors. Nano Letters 16, 4925-4931 (2016).

(Reference 16) K. Peng et al., Single Nanowire Photoconductive Terahertz Detectors. Nano Letters 15, 206-210 (2015).

(Reference 17) Q. Gao et al., Selective-Area Epitaxy of Pure Wurtzite InP Nanowires: High Quantum Efficiency and Room-Temperature Lasing. Nano Letters 14, 5206-5211 (2014).

(Reference 18) S. A. Baig et al., An Ultrafast Switchable Terahertz Polarisation Modulator Based on III-V Semiconductor Nanowires. Nano Letters 17, 2603-2610 (2017).

(Reference 19) B. Guilhabert et al., Transfer Printing of Semiconductor Nanowires with Lasing Emission for Controllable Nanophotonic Device Fabrication. ACS Nano 10, 3951-3958 (2016).

(Reference 20) E. Castro-Camus et al., Photoconductive response correction for detectors of terahertz radiation. J Appl Phys 104, 053113 (2008).

(Reference 21) C. Y. Li, C. C. Chang, Q. L. Zhou, C. L. Zhang, H. T. Chen, Resonance coupling and polarisation conversion in terahertz metasurfaces with twisted split-ring resonator pairs. Optics Express 25, 25842-25852 (2017).

(Reference 22) E. Castro-Camus, M. B. Johnston, Extraction of the anisotropic dielectric properties of materials from polarisation-resolved terahertz time-domain spectra. Journal of Optics A: Pure and Applied Optics 11, 105206 (2009).

(Reference 23) Q. Gao et al., Simultaneous selective-area and vapor-liquid-solid growth of InP nanowire arrays, Nano Letters 16, 4361-4367 (2016).

(Reference 24) N. Wang et al., Shape engineering of InP nanostructures by selective area epitaxy, ACS Nano 13, 7261-7269 (2019).

The invention claimed is:

1. A detector for detecting terahertz electromagnetic radiation incident along a direction of incidence, the detector comprising:
   a substrate; and
   a pair of detector elements supported on the substrate, the detector elements being electrically isolated from each other, each detector element comprising:
      a pair of antenna elements having a gap therebetween; and
      a switch element comprising one or more pieces of photoconductive semiconductor material connected between the antenna elements across the gap,
      the pairs of antenna elements of the respective detector elements being configured so that, when the switch element is conductive, current is generated between the antenna elements by polarisation components of incident terahertz electromagnetic radiation having polarisation directions in respective sensing directions that are transverse.

2. A detector according to claim 1, wherein the switch elements of the pair of detector elements cross as viewed along an axis parallel to the direction of incidence and are electrically isolated from each other.

3. A detector according to claim 2, wherein the antenna elements of the pair of detector elements are disposed around the axis without overlap along the direction of incidence.

4. A detector according to claim 1, wherein the pair of antenna elements of each detector element have a bow-tie arrangement.

5. A detector according to claim 1, wherein the or each piece of photoconductive semiconductor material has a thickness in a direction along the axis of less than 1000 nm.

6. A detector according to claim 1, wherein the or each piece of photoconductive semiconductor material comprises a nanowire of photoconductive semiconductor material.

7. A detector according to claim 6, wherein the nanowire has a hexagonal cross-section.

8. A detector according to claim 1, wherein the or each piece of photoconductive semiconductor material comprises a strip of photoconductive semiconductor material.

9. A detector according to claim 8, wherein the strip of photoconductive semiconductor material has a rectangular cross-section.

10. A detector according to claim 8, wherein the strip of photoconductive semiconductor material has a ratio of width in a direction perpendicular to the axis to thickness in a direction along the axis that is at least two, preferably at least ten.

11. A detector according to claim 1, wherein the switch element of each detector element comprises an array of pieces of photoconductive semiconductor material.

12. A detector according to claim 1, wherein the substrate is made of an electrically insulating material.

13. A detector according to claim 1, wherein the respective sensing directions are perpendicular.

14. A detector according to claim 1, wherein the detector comprises plural pairs of detector elements in an array.

15. A detector according to claim 1, further comprising a detection circuit connected to the antenna elements of each detector element for detecting the generated current.

16. A terahertz electromagnetic radiation detection apparatus, comprising:
   a detector according to claim 1;
   a terahertz electromagnetic radiation system arranged to direct terahertz electromagnetic radiation onto the detector along the direction of incidence; and
   a control system arranged to direct light onto the detector for controlling the conductivity of the switch element.

17. A terahertz electromagnetic radiation detection apparatus according to claim 16 that is arranged to perform time domain spectroscopy.

18. A detector for detecting terahertz electromagnetic radiation incident along a direction of incidence, the detector comprising:
   a substrate; and
   at least one detector element supported on the substrate, the detector element comprising:
      a pair of antenna elements having a gap therebetween; and
      a switch element comprising a strip of photoconductive semiconductor material connected between the antenna elements across the gap,
      the antenna elements being configured so that, when the switch element is conductive, current is generated between the antenna elements by incident terahertz electromagnetic radiation,
      wherein the strip of photoconductive semiconductor material has a ratio of width in a direction perpendicular to the axis to thickness in a direction along the axis that is at least two.

19. A detector according to claim 18, wherein the strip of photoconductive semiconductor material has a rectangular cross-section.

20. A detector according to claim 18, wherein the strip of photoconductive semiconductor material has a thickness in a direction along the axis of less than 1000 nm.

21. A detector according to claim 18, wherein the substrate is made of an electrically insulating material.

22. A detector according to claim 18, further comprising a detection circuit connected to the antenna elements of each detector element for detecting the generated current.

23. A terahertz electromagnetic radiation detection apparatus, comprising:
   a detector according to claim 18;
   a terahertz electromagnetic radiation system arranged to direct terahertz electromagnetic radiation onto the detector along the direction of incidence; and a control system arranged to direct light onto the detector for controlling the conductivity of the switch element.

24. A terahertz electromagnetic radiation detection apparatus according to claim 23 that is arranged to perform time domain spectroscopy.

25. A detector according to claim 18, wherein the strip of photoconductive semiconductor material has a ratio of width in a direction perpendicular to the axis to thickness in a direction along the axis that is at least at least ten.

* * * * *